US012587780B1

(12) United States Patent
Clark et al.

(10) Patent No.: US 12,587,780 B1
(45) Date of Patent: Mar. 24, 2026

(54) REAR SIDE ACOUSTIC METAMATERIAL COMPENSATION SYSTEM

(71) Applicant: Dan Clark Audio Inc., San Diego, CA (US)

(72) Inventors: Daniel William Clark, San Diego, CA (US); Robert Jason Egger, San Diego, CA (US)

(73) Assignee: Dan Clark Audio Inc., San Diego, CA (US)

( * ) Notice: Subject to any disclaimer, the term of this patent is extended or adjusted under 35 U.S.C. 154(b) by 188 days.

(21) Appl. No.: 18/605,903

(22) Filed: Mar. 15, 2024

Related U.S. Application Data

(63) Continuation-in-part of application No. 17/849,432, filed on Jun. 24, 2022.

(60) Provisional application No. 63/234,944, filed on Aug. 19, 2021.

(51) Int. Cl.
*H04R 1/28* (2006.01)
*H04R 1/10* (2006.01)
*H04R 9/02* (2006.01)

(52) U.S. Cl.
CPC ......... *H04R 1/2896* (2013.01); *H04R 1/1008* (2013.01); *H04R 1/2857* (2013.01); *H04R 1/288* (2013.01); *H04R 9/025* (2013.01)

(58) Field of Classification Search
CPC .. H04R 1/2896; H04R 1/1008; H04R 1/2857; H04R 1/288; H04R 9/025
See application file for complete search history.

(56) References Cited

U.S. PATENT DOCUMENTS

| | | | |
|---|---|---|---|
| 4,006,321 | A | 2/1977 | Carlson |
| 8,000,486 | B2 | 8/2011 | Hildebrandt |
| 8,457,341 | B2 | 6/2013 | Danley |

(Continued)

FOREIGN PATENT DOCUMENTS

| | | | |
|---|---|---|---|
| JP | 2011215187 | A | 10/2011 |
| SU | 1721841 | A1 | 3/1992 |
| WO | 2020208380 | A1 | 10/2020 |

OTHER PUBLICATIONS

Degraeve, S., et al.; "Metamaterial Absorber for Loudspeaker Enclosures"; presented at the Audio Engineering Society 148$^{th}$ Convention; Jun. 2-5, 2020; 9 pages.

*Primary Examiner* — Suhan Ni
(74) *Attorney, Agent, or Firm* — Hall Estill Law Firm

(57) ABSTRACT

Method and apparatus for reducing standing waves, reflections and other undesired components from acoustic waves generated by a transducer. A rear side acoustic compensation structure is coupled to a rear side of the transducer and includes a metamaterial resonator array with one or more resonator channels. A bypass path structure directs a first portion of the rear directed sound waves into the resonator array and a remaining second portion of the rear directed sound waves away from the resonator array. The bypass path structure can include an impedance boundary formed from a layer of poroacoustic material. A front side acoustic compensation insert can be used to further modify the sound waves directed toward the listener. The resonator array can be housed within the interior of a vented or unvented closed cup structure or in an open cup structure. The system is particularly suitable for headphone applications.

20 Claims, 23 Drawing Sheets

(56) References Cited

U.S. PATENT DOCUMENTS

| | | | | |
|---|---|---|---|---|
| 8,472,636 | B2 | 6/2013 | Sibbald | |
| 8,983,103 | B2 | 3/2015 | Vlach et al. | |
| 9,106,999 | B2 | 8/2015 | Darlington | |
| 9,191,734 | B2 | 11/2015 | Sporer et al. | |
| 9,525,944 | B2 | 12/2016 | Clemen, Jr. | |
| 9,613,615 | B2 | 4/2017 | Nystrom | |
| 9,762,994 | B2 | 9/2017 | Mathur | |
| 9,820,032 | B1 * | 11/2017 | Zhang .................. | H04R 1/2826 |
| 9,959,855 | B2 | 5/2018 | Song et al. | |
| 10,182,287 | B2 | 1/2019 | Struzik et al. | |
| 10,453,438 | B1 | 10/2019 | Griffin et al. | |
| 10,701,478 | B1 * | 6/2020 | Mathur .................. | H04R 1/025 |
| 10,950,212 | B1 | 3/2021 | Mathur | |
| 11,564,031 | B2 | 1/2023 | Peeters | |
| 11,640,816 | B1 | 5/2023 | Mathur | |
| 11,647,326 | B2 | 5/2023 | Oclee-Brown et al. | |
| 2009/0084624 | A1 * | 4/2009 | Dickie ................. | H04R 1/2819<br>181/152 |
| 2020/0100021 | A1 * | 3/2020 | Pavlov ................. | H04R 1/2842 |
| 2022/0180853 | A1 | 6/2022 | Memoli et al. | |

* cited by examiner

SECTION O-O

CLOSED, DIRECTLY COUPLED

OPEN, DIRECTLY COUPLED

CLOSED, INDIRECTLY COUPLED

CLOSED, BOTH DIRECTLY AND INDIRECTLY COUPLED

CLOSED, DIRECTLY COUPLED, INDIVIDUAL RESONATORS

REAR SIDE ACOUSTIC METAMATERIAL COMPENSATION SYSTEM

RELATED APPLICATIONS

This application is a continuation-in-part (CIP) of copending U.S. patent application Ser. No. 17/849,432 filed Jun. 24, 2022, which in turn makes a claim of domestic priority under 35 U.S.C. 119(e) to U.S. Provisional Patent Application No. 63/234,944 filed Aug. 19, 2021. The contents of both of these applications are hereby incorporated by reference.

SUMMARY

Various embodiments are generally directed to an apparatus and method for controlling frequency response and reducing standing waves, reflections and other undesired components from acoustic sound waves generated by a transducer.

Without limitation, some embodiments are directed to an audio headphone environment wherein a transducer (driver) is adapted to generate audibly detectable acoustic waves for a user. The transducer is placed adjacent an ear cavity of the user and concurrently generates forward directed and rear directed sound waves in response to an input electrical driver signal. The forward directed sound waves are emitted from a front side of the transducer into the ear cavity, and the rear directed sound waves are emitted from a rear side of the transducer away from the ear cavity.

A rear side acoustic compensation structure is coupled to the rear side of the transducer and includes a resonator array that is configured to receive a first portion of the rear directed sound waves along a first transmission path. The resonator array has at least one resonator channel configured to suppress at least one selected frequency of interest in the first portion of the rear directed sound waves received by the resonator array.

The rear side acoustic compensation structure further has a bypass path structure adjacent the resonator array. The bypass path structure is configured to direct the first portion of the rear directed sound waves into the resonator array, and to direct a remaining second portion of the rear directed sound waves along a second transmission path away from the resonator array. The second transmission path operates to dampen an overall energy level of the remaining second portion.

In further embodiments, the bypass path structure may include an impedance boundary that is affixed to the rear side of the transducer adjacent the resonator array. The resonator array may be directly coupled to the transducer such as via a waveguide, or may be indirectly coupled to the transducer so that the first transmission path passes through an air cup volume prior to entering the resonator array. Generally, the resonator array operates to compensate selected frequencies of interest within the transducer response for the sound energy that passes along the first transmission path, and the bypass path structure operates to dampen and reduce reflections and standing waves for the sound energy that passes along the second transmission path.

In further embodiments, a front side acoustic compensation insert can be concurrently used in conjunction with the rear side acoustic compensation structure to modify the front directed sound waves reaching the user.

These and other features and advantages of various embodiments can be understood from a review of the following detailed description in conjunction with a review of the accompanying drawings.

DETAILED DESCRIPTION

Figure 1:
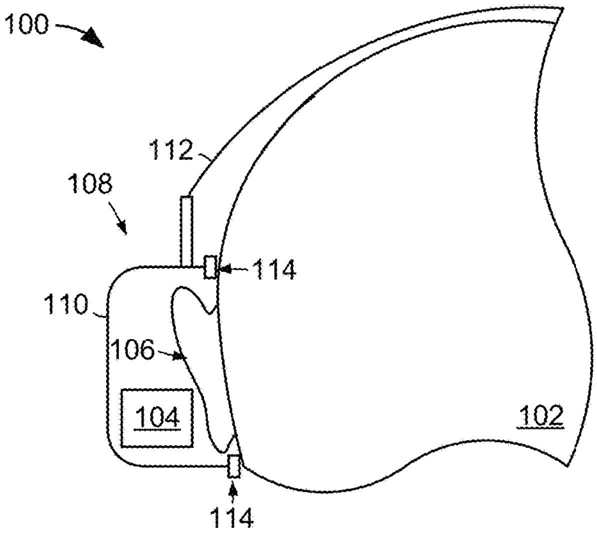
FIG. 1 shows a line representation of portions of an example acoustic environment in which various embodiments of the present disclosure may be practiced.

Embodiments of the present disclosure are generally directed to an acoustic metamaterial waveguide, diffusion, and absorption system that optimizes transmission of acoustic waves from a transducer to an ear cavity of a user.

In systems that generate acoustic waves designated for a single user, such as open or closed back headphones and earphones that rest on or surround an ear, the transducer, ear, and ear coupler create a complex closed system that forms standing waves which can distort, alter, and/or degrade the accuracy of the acoustic waves that increase listener fatigue and decrease system fidelity.

As is understood by members of the trade, a loudspeaker in a room will setup standing pressure waves, which are particularly problematic at low frequencies and are very difficult to correct. In headphones, the ear-hole of an ear pad, along with the listener's ear and the audio transducer, define the "room," which is also affected by standing waves, but due to the small volume, the standing waves mostly occur above 3 KHz. Hence, there is a continuing goal to provide an acoustic system that provides physical comfort to a user while providing accurate and efficient transmission of acoustic waves by remediation of standing waves inherent to an enclosed acoustic space in headphones.

Various embodiments of the present disclosure provide a number of novel and innovative systems that mitigate the generation and transmission of standing waves as well as directly shaping frequency response in an acoustic environment. The systems can include one or more front side acoustic tuning structures, one or more rear side acoustic structures, or both. While various embodiments are particularly illustrated as being suitable for an earphone type environment, such is not necessarily required or limiting.

As explained below, some embodiments provide a front side acoustic structure, or insert, that is disposed between the acoustic driver and the user. The front side acoustic insert may be disposed in a medial location within the ear cavity of the user, and may be configured to operate as an integrated inline triple-function diffuser, waveguide and resonator. The insert may be arranged as a metamaterial array of resonators with diffusion surfaces between the transducer and the listener's ear. The application of the metamaterials may include, but does not require, an impedance boundary between the metamaterial and the transducer. Various features of these front side embodiments are set forth below including in the discussion of FIGS. 1 through 18.

Further embodiments provide a rear side acoustic structure that is disposed on the rear side of the acoustic driver opposite the ear cavity of the user. The rear side acoustic structure is configured to absorb or otherwise cancel outwardly directed acoustic energy from the transducer. This generally provides an "open field" type response behind the transducer, so that primary source waves from the transducer are essentially fully absorbed and provide essentially no reflectance, particularly when the headphone uses a closed-back cup design. Secondary source waves reflected back from the user's eardrum (tympanic membrane) may also be absorbed. This reduces or eliminates the generation of standing waves within the ear cup whilst providing acoustic isolation from the surrounding environment.

As with the front side acoustic insert, the rear side acoustic structure may be formed of a suitable metamaterial with various resonators tuned to various frequencies. Other construction arrangements can be used. The orientations, lengths and paths taken by these tubes can vary depending on a number of factors. Various features of these rear side embodiments are set forth below including in the discussion beginning at FIG. 19 through the end.

It will be noted that the various embodiments presented herein tend to illustrate the use of a planar-magnetic transducer. This is merely illustrative and is not limiting, as the disclosed embodiments are readily applicable to substantially any planar or non-planar transducer configurations, including but not limited to dynamic and electrostatic transducers. Quarter-wave resonators and Helmholtz resonators are particularly suitable, but are not limiting. The resonators can be deployed at any angle using any shape, straight, curved, etc, with any cross-sectional shape and size. Impedance boundaries can optionally be used as required as part of a bypass path structure that establishes a first transmission path of the rear directed sound waves into the resonator array(s) and a second transmission path of the rear directed sound waves that bypass the resonator array(s).

These and other features of various embodiments can be understood beginning with a review of FIG. 1 which depicts a line representation of portions of an example acoustic environment 100 in which assorted embodiments can be practiced. A user 102 can couple one or more acoustic drivers 104 (transducer) to an ear 106 with a headphone 108. While not limiting or required, the headphone 108 can have an ear coupler 110 that is enclosed or open. The ear coupler 110 is positioned adjacent an ear 106 of the user 102 by a headband 112, but such feature is not required as any head attachment means can be utilized to secure the ear coupler 110 in position relative to the user's ear 106 and head.

It is contemplated that the ear coupler 110 presents one or more ear pads 114 to physically contact the user's ear 106 and/or head. Some embodiments of the headphone 108 position some, or all, of the ear coupler 110 within the areal extent of the user's ear 106. It is noted that the areal extent of an ear can be characterized as the area within the outer boundary of a user's ear 106. For instance, an ear coupler 110 may be positioned wholly within (in-ear headphone), partially outside (on-ear headphone), or wholly outside (over-ear headphone) the areal extent of a user's ear 106.

Regardless of the position, assembly, and arrangement of the ear coupler 110 and acoustic drivers 104 relative to the ear 106, acoustic waves generated by a driver 104 can become altered, distorted, and/or degraded by standing waves before arriving at the eardrum of the user 102. That is, due to the relatively short distance, acoustic waves above 3 KHz generated by the drivers 104 can interfere to sum, or cancel, which renders the system non-linear.

Figure 2:
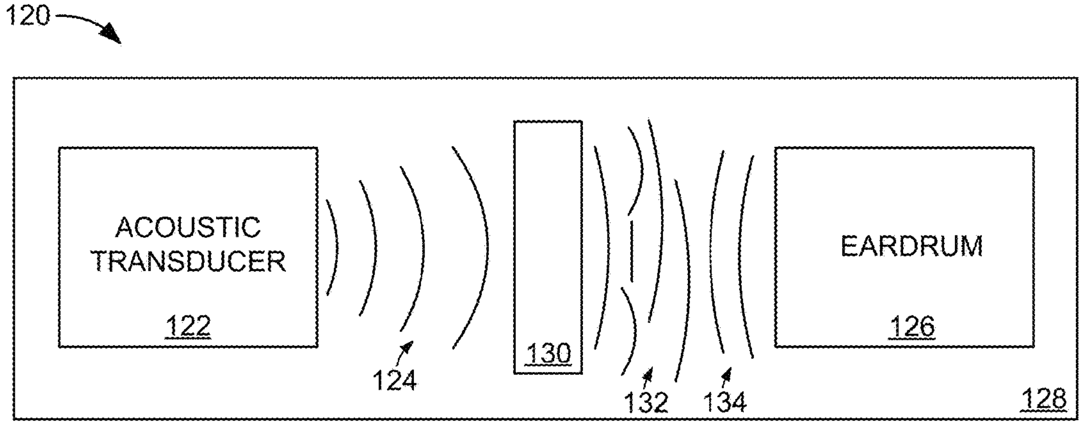
FIG. 2 depicts a block representation of portions of an acoustic system operated in accordance with some embodiments.

FIG. 2 depicts a block representation of an example acoustic system 120 where acoustic waves are degraded in accordance with various embodiments. As shown, an acoustic transducer 122 generates an initial acoustic wave 124 directed towards a user's eardrum 126. Within a closed volume 128 defined by the components housing the transducer 122, an acoustic impedance structure 130 collectively represents the response of the transducer, ear pad, as well as the structure of the user's ear. The initial wave 124 interacts with the acoustic impedance structure 130 to provide impinging wave 132 and reflected wave 134, which can interact to establish one or more standing waves within the volume 128. The standing waves degrade linearity at the eardrum 126, thereby creating peaks and troughs in the perceived frequency response.

The standing waves will vary in amplitude and frequency based on the individual listener's physical ear structures, ear coupler geometry, ear coupler material, and other geometric considerations. The net effect is that high frequency performance varies materially by user, as every ear is unique, and the resultant peaks and troughs create an unpredictable listening experience because the specific peaks and troughs vary in amplitude and frequency perceived by the user.

Accordingly, various embodiments are directed to structure and techniques to affect standing waves in audio with novel mechanical structure placed between the audio transducer 122 and eardrum 126 that integrates metamaterial waveguide, diffusion, and absorption techniques to reduce standing waves and smooth frequency response peaks and troughs and adjust tonal balance.

Figure 3A:
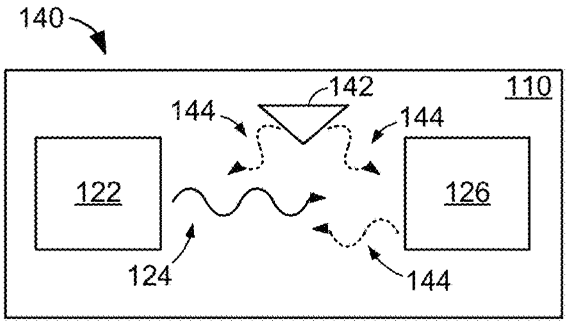
FIGS. 3A and 3B respectively depict block representations of portions of example acoustic systems arranged in accordance with assorted embodiments.
Figure 3B:
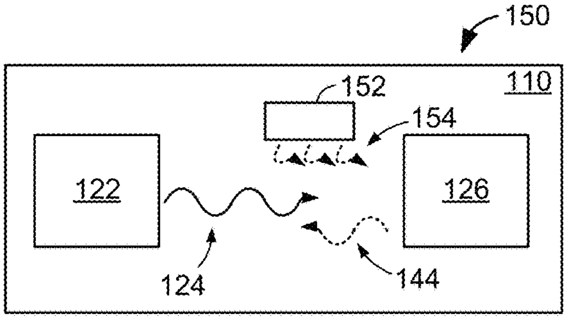

FIGS. 3A and 3B respectively depict block representations of portions of example acoustic systems 140/150 in which assorted embodiments are employed. There are two conventionally accepted approaches to mitigate standing waves in enclosed spaces; diffusion and absorption. While waveguides, resonator, and diffusion have been utilized as individual technologies in various embodiments, the integration of all three technologies within a single physical structure placed inline between the transducer and the ear provides improved product development, manufacturability, and product consistency while allowing precise control of the high-frequency performance of the system across a wide range of listener's ear's acoustic impedances that cannot be realized with standalone diffusers, absorbers, and/or resonators, particularly in headphone where space for complex apparatus is necessarily limited.

In FIG. 3A, a diffuser 142 is placed proximal to an audio transducer 122 and an eardrum 126 to randomize acoustic waves and mitigate the development of standing waves within an ear coupler, such as coupler 110 of FIG. 1. Incidental waves 144 are not limiting, but illustrate how reflected waves 146 can contribute back into other waves to reduce standing waves. However, such randomization of reflected waves can not compensate for all standing waves within a system and requires material physical space due to relevant audio wavelengths.

The acoustic system of FIG. 3B displays how placement of an acoustically absorbent material 152 proximal to the audio transducer 122 and eardrum 126 within an ear coupler 110 can reduce the amplitude of reflected waves 154 as some acoustic energy is dissipated within the absorbent material 152. The use of one or more absorbent materials 152 in a system 150 can reduce the intensity of acoustic waves reaching the eardrum 126. It is contemplated that some acoustic systems employ one or more diffusers 142 and/or absorbent materials 152 with varying shapes and/or sizes to customize the transmission and/or absorption of acoustic wave energy. Yet, user's ears are often unique and present structure that acts differently on acoustic waves and limit the benefits of conventional diffusion and absorption configurations. Hence, assorted embodiments are directed to interchangeable acoustic components that optimize and, in some embodiments, customize how acoustic waves are transferred to an eardrum 126 with respect to the structure of a user's ear.

Figure 4:
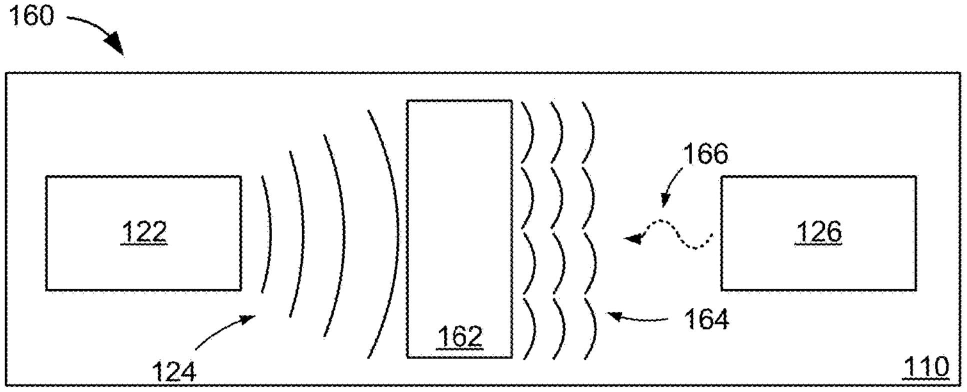
FIG. 4 depicts a block representation of portions of an example acoustic diffusion and absorption system in accordance with some embodiments.

FIG. 4 depicts a block representation of portions of an example acoustic system 160 configured and operated in accordance with various embodiments to provide a waveguide with both acoustic absorption and diffusion to optimize delivery of acoustic waves to an eardrum 126. With placement of one or more inserts 162 between an audio transducer 122 and a user's eardrum 126, initial acoustic waves 124 pass through the device to become waves 164. Insert 162 is optimized to the enclosed space around the user's eardrum 126, such as the user's ear and the ear coupler housing the audio transducer 122 and insert 162. It is contemplated that the frequency response of the initial wave 164 is affected by resonators to reduce energy where standing waves are likely to form.

It is noted that pressure waves 166 reflected back from the eardrum 126, as well as the ear and ear pads, as illustrated in FIG. 1, reflect back towards the insert 162, which then diffuses portions of the wave while absorbing the reflected high frequency energy with resonators, which absorb waves at targeted frequencies prone to standing waves to insure the waves 164 are preserved as faithfully as possible between the transducer 122 and eardrum 126 in the ear coupler 110. In some embodiments, the insert 162 is configured to have partially one way flow. As such, embodiments of this disclosure are directed to an acoustic metamaterial tuning system (AMTS) that integrates a waveguide with diffusion and absorption elements into a common structure to provide a designer unprecedented control of resonances within a headphone or other acoustic wave transmission system, which results in exceptionally smooth measured acoustical frequency response.

FIGS. 5A-5F respectively depict line representations of portions of an example front side acoustic tuning structure (insert) 170 that customizes and optimizes acoustic wave transmission to a user's ear, particularly in a headphone environment where the structure of a user's ear contributes to the dynamics of an enclosed volume that houses one or more acoustic transducers. By integrating diffusion and absorption into the common structure of the waveguide insert 170 between an audio transducer and a user's ear, it is possible to substantially smooth the frequency response of an acoustic system to levels heretofore unseen in headphone performance, particularly where high frequency linearity performance has been limited by the presence of standing waves.

Figure 5A:
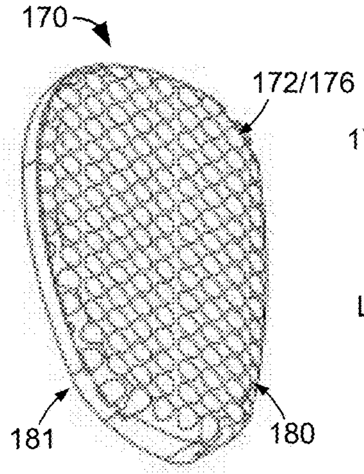
FIGS. 5A-5F respectively depict portions of an example insert that can be employed in an acoustic diffusion and absorption system.

The perspective view of FIG. 5A illustrates the insert 170 as a single piece of material, such as a foam, polymer, metal, rubber, or combination thereof. The insert 170 can be arranged within an ear cavity of the user as generally depicted in FIG. 4, with an ear side 180 of the insert 170 in facing relation to the eardrum 126 and a transducer side 181 in facing relation to the transducer 122.

Figure 5B:
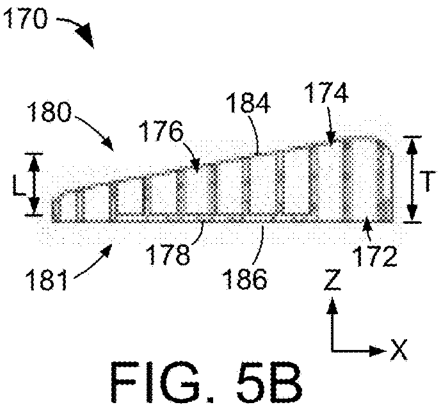

The insert 170 is provided with a plurality of separate channels 172/176 that respectively extend along apertures 174 in the insert 170 material, as shown in the cross-section of FIG. 5B. It is noted that the waveguide insert 170 may, in some embodiments, be constructed of more than one piece of material that are joined, attached, fastened, or physically adjacent when fabrication as a single component is impractical.

The cross-sectional view of FIG. 5B further shows the channels 172 as open channels that extend continuously through the thickness (T) of the insert 170, as measured parallel to the Z axis, and the channels 176 as closed channels that are terminated on the bottom surface of the insert 170. The placement of a blocking wall 178 to close a channel 176 creates a length (L), as measured parallel to the Z axis, that forms a quarter wave resonator while surfaces of the insert 170 acts as an impedance node that reflect some of the acoustic energy through diffusion to optimize acoustic wave transmission through mitigation of standing waves on the ear side 180 of the front side insert 170.

The tuned position and thickness of the blocking wall 178 can control the length of the channel resonator, which provides varied acoustic performance for the plurality of channels 172/176. To clarify, the insert 170 can be configured with one or more types of channels 172/176 that continuously, or partially, extend between apertures in opposite sides of the insert 170 (e.g., ear side 180 and transducer side 181).

Figure 5C:
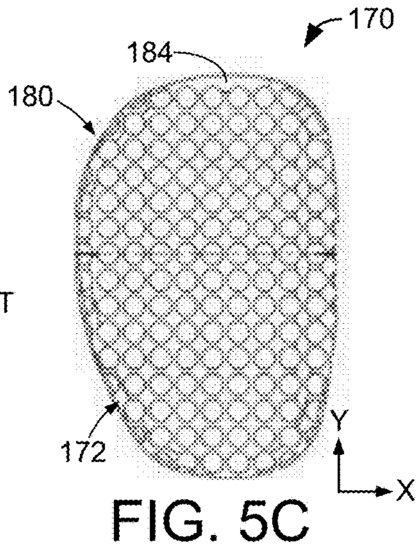

A plan view of the ear side 180 of the insert 170 is shown in FIG. 5C to show how the respective channels 172/176 are patterned as separate circular aspects with a common size. However, such configuration is not required or limiting as the pattern of separate channels 172/176 can incorporate different sizes, shapes and separation distances.

Figure 5D:
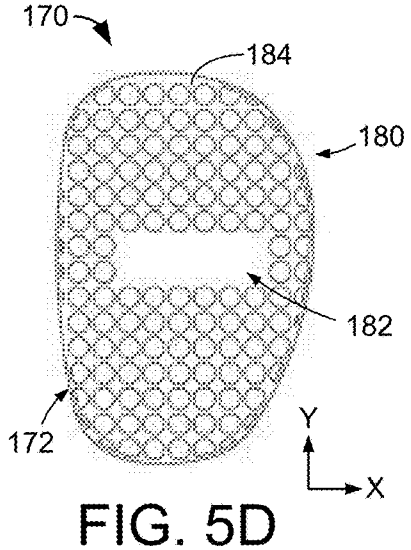

An alternative plan view of the ear side 180 of the insert 170 is shown in FIG. 5D to illustrate another embodiment of the channel 172/176 pattern where a solid region 182 with no channels 172/176 are positioned approximately in the center of the insert 170, as measured in the X-Y plane. It is noted that the solid region 182 can have any size, shape, and position that can complement the apertures 174 at either end of an open channel 172 to create a larger diffusion surface area, which may or may not be contoured.

As shown in the cross-sectional profile of FIG. 5B, a top surface 184 along the ear side 180 of the insert 170 can have a varying contour/topography compared to a transducer side bottom surface 186. While not limiting, a bottom surface 186 can have a flat, non-varying contour along the Z axis while the top surface 184 has a flat, or angled, contour relative to the bottom surface 186. Tuning the slope and contour of the top surface 184 relative to the bottom surface 186 allows for varying lengths of open channels 172 and varying lengths of closed channels 176, which controls the behavior of acoustic wave transfer through the insert 170 and reduces standing waves while smoothing frequency response. It is noted that the top surface 184 forms an impedance node to diffuse wave energy striking the insert 170 and the varying surface geometry, along with the ratio of perforations to surface area and surface topography, create a tuned diffusion function for a headphone system.

Figure 5E:
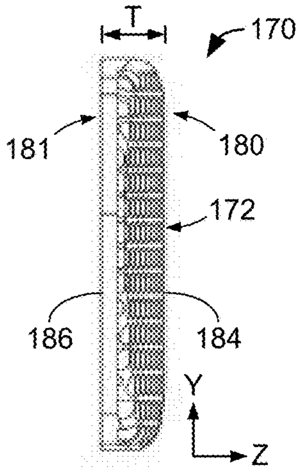
Figure 5F:
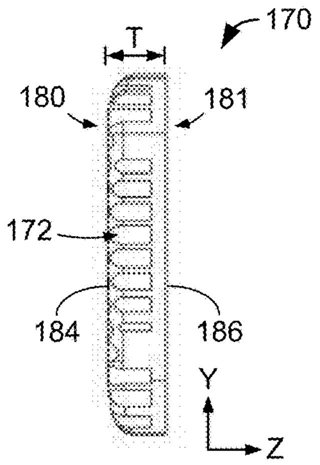

FIG. 5E displays a first side profile of the insert 170 while FIG. 5F displays the opposite second side profile. The respective profiles show how the respective channels 172/176 pattern produces different depths/lengths and each extend along the Z axis. It is noted that not all channels 172/176 are required to have a circular cross-sectional shape one or more apertures 174 and/or channels 172/176 can have a shape, size, and orientation that is tuned to optimize the acoustic wave transmission and system frequency response in response to the volume and shape of a user's ear 106 and eardrum 126. That is, the ability to tune the configuration of apertures 174 and channels 172/176 allow for precise control of how sound waves travel through, and reflect from, the insert 170. As noted previously, channels 172/176 can extend inwardly from the ear side 180, from the transducer side 181, or from both sides as desired.

Figure 6:
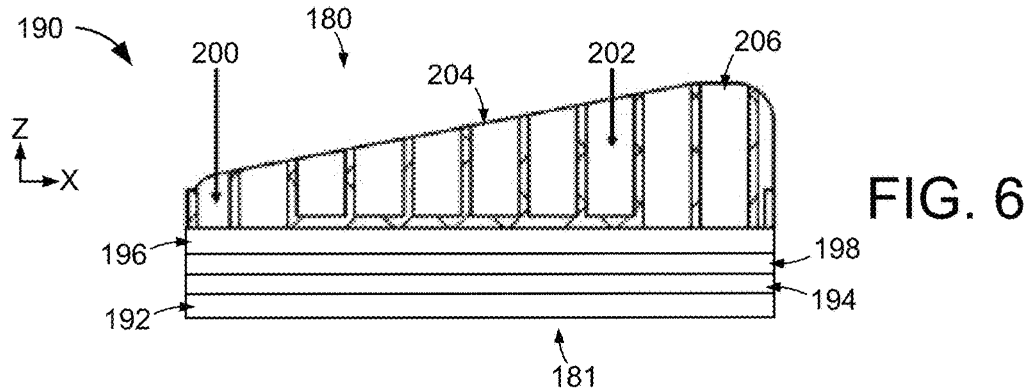
FIG. 6 depicts a cross-sectional view of portions of example insert that can be utilized in an acoustic diffusion and absorption system.

FIG. 6 depicts a cross-sectional line representation of an example insert 190 arranged in accordance with assorted embodiments to optimize the transmission of acoustic waves. An audio transducer 192, such as a planar magnetic, electret, electrostatic, or dynamic driver, outputs energy through an acoustic compression chamber 194 and plurality of material layers 196/198, before passing through a waveguide 200.

It is contemplated that the layers 196/198 can have different Rayl values to allow waves, such as wave 124 of FIG. 4, to pass through waveguide 200 to enter the cavity defined by the ear pad and the listener's ear. While some acoustic energy at targeted frequencies is absorbed by resonators 202 as waves pass through the waveguide 200, the rest of the energy enters the ear canal or reflects off the ear and ear pad back towards the insert 190. A portion of the reflected wave energy is diffused by the top surface 204 and the balance is reflected into open channels 206.

When used, the material layer 196 forms an impedance node. While not limiting, layer 196 can be a resistive material, such as an acoustic screen or paper with at least a 50 Rayl value while the porous-matrix layer 198 can be an absorbent material, such as acoustic foam or felts. The higher the Rayl value of the respective layers 196/198, the higher the Q and attenuation of the resultant resonator, which is why the solid termination of the resonators 202 results in the highest possible filter Q and attenuation.

All reflected wave energy entering the waveguide 200 passes through to the compression chamber 194 if layers 196/198 are not present, which allows standing waves to develop. Thus, configuring of one, or both, layers 196/198 with a sufficiently high Rayl value can transform channels 206 into a waveguide 200 for the initial audio wave that subsequently function as a quarter wave resonators with a low Q value to absorb reflected wave energy and greatly reduce formation of standing waves at resonator frequencies. The remaining reflected wave energy enters resonators 202 where attenuation of targeted frequencies occurs with higher Q and greater attenuation values. As such, channel 206 acts as a waveguide 200 for the initial wave, but transforms into a low Q resonator for reflected waves.

In this way, layers 196/198 transform a "two-way" waveguide 200 into a "one-way" waveguide that doubles as a low Q, low attenuation resonator for reflected wave energy. It is noted that closed resonators 202 with hard termination complement the open channels 206 and function independently of use of layers 196/198.

The waveguide 200 may have a constant, swept path, or tapered, cross-sectional area to tune how acoustic waves transfer through the insert 190. The insert 190, and constituent channels 202/206, may be oriented at any angle relative to the Z axis and audio transducer 192, and/or other waveguides, to control and direct acoustic wave propagation within the system. For example, one or more channels 202/206 can be oriented towards the pinna aspect of a user's ear while other channels 202/206 are oriented towards the concha aspect of the user's ear. It is noted that the orientation of a channel 202/206 can be defined as parallel to a longitudinal axis of the channel 202/206 between channel sidewalls.

It is noted that the insert 190 may be individually removable, affixed to the baffle or driver, or attached to impedance node 196, or attached to porous-matrix material layer 198. It is noted that the assorted channels 202/206 are not required to be parallel to one another or to the Z axis. It is contemplated that if no layer 196/198 material is in place, a reflected acoustic wave passes through the waveguide 200 then hits the transducer 192 and again reflects back through insert 190 towards the ear, creating conditions for a standing wave which, in some instances, may be desirable. Layers 196/198 maybe deployed under the entire insert 190 or under specific waveguides 200 therein to leave some channels 202/206 uncovered with material layers 196/198.

It can be appreciated that the structure of the insert 190, and specifically the contour of the top surface 208 creates an impedance node with controlled diffusion while channels 202 provide high-Q resonators for reflected waves. In accordance with some embodiments, the assorted channels 202/206 are configured as embedded resonators. An array of resonating channels 202/206, as generally illustrated in FIGS. 5A-5F, may be deployed with varying depths and/or varying Q to effect a broad-spectrum of frequency response and overlapping operating frequencies that allow the system to act as a wide-bandwidth filter. In some systems, such as a headphone environment, ear pads can have diameters exceeding 7.5 cm, and quarter-wave effects thus down to approximately 1.8 cm. With proper design of the top surface 204 and assorted channels 202/206, a diverse range of resonator wavelengths can be targeted, which enables insert 190 deployment with to resolve a broad range of potentially problematic standing waves within a headphone environment.

Figure 7A:
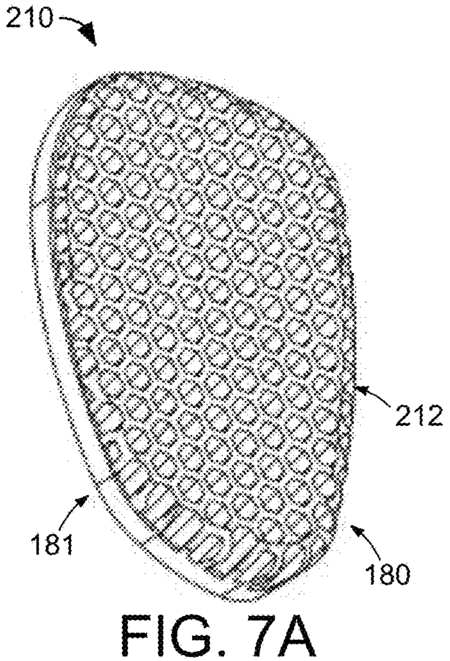
FIGS. 7A-7D respectively depict aspects of an example insert that can be employed in an acoustic diffusion and absorption system.

FIGS. 7A-7D respectively depict portions of an example insert 210 arranged in accordance with various embodiments to tune and optimize the transmission of acoustic waves to a user's eardrum. As shown in FIG. 7A, a non-limiting example of a single piece of rigid material has a pattern 212 of channels that are each configured with a hexagonal shape in the X-Y plane. It is noted that the respective channels extend from an aperture that has a tuned shape and can be utilized in the pattern 212 alone, or in combination. For instance, all, or some, apertures may be configured with circular, triangular, rhomboid, or parallelogram shapes, of matching, or varying cross-sectional sizes, in the X-Y plane to provide a desired waveguide and resonator behavior in use.

Figure 7B:
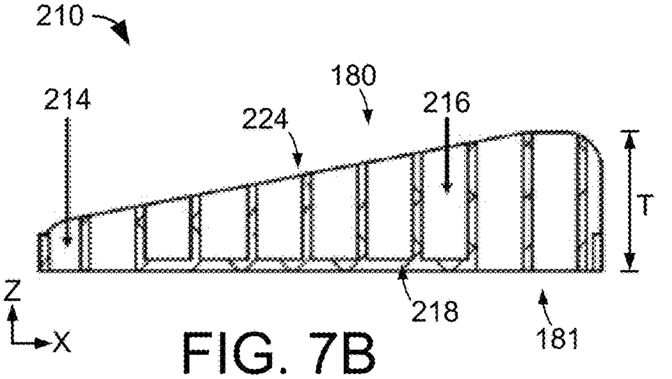

The ability to arrange the respective channels of the pattern 212 with different, varying, or uniform sizes, shapes, and orientations relative to the Z axis allows for a diverse variety of waveguide, diffusion, and resonator characteristics that control frequency response and standing waves. Further tuning of the respective channels associated with the pattern 212 can be facilitated by configuring the cross-sectional area of the insert 210 along the Z-X plane, as illustrated in FIG. 7B. By configuring some channels 214 as open and extending through the thickness (T) of the insert 210 while other channels 216 are terminated, which can be defined as having a depth to the blocking surface 218 that is less that the complete insert thickness. It is noted that while the blocking surface in FIG. 7B has a uniform thickness along its length, along the X axis, such configuration is not required and the blocking surface 218 can define a variety of different, perhaps varying, depths for one or more closed channels 216 and the blocking surface 218 may also have a small tuned aperture that matches, or differs, from other insert aperture shapes, sizes, and orientations.

Through the channels 214/216 tuning, the propensity to develop standing waves is reduced by placing a structure comprised of diffusion surfaces 220, embedded audio waveguides 214, and absorption structures 216 between the audio transducer and the user's ear. It is contemplated that the various aspects of the insert 210 may be integrated into, or under, an ear pad fabricated of, for instance, fabric, foam, 3D printed polymer, or molded materials.

It is contemplated that the open channels 214 form audio waveguides that can be configured with any cross-sectional geometry, may be straight or tapered, and may be vertical or angled relative to the audio transducer to customize the acoustic energy transmission through the insert 210. The open channel 214 waveguides may be of uniformly, or variably, spaced and sized within the pattern 212. Some embodiments arrange the closed channels 216 as quarter wave resonators, as shown, while other embodiments provide Helmholtz resonators with the closed channels 216. The respective resonators may have varied cross-sectional shapes, and may and may even be "folded" around themselves, follow a swept, or follow irregular path along the Z axis to provide longer acoustic energy path lengths and control lower frequencies, such as below 3000 Hz.

Figure 7D:
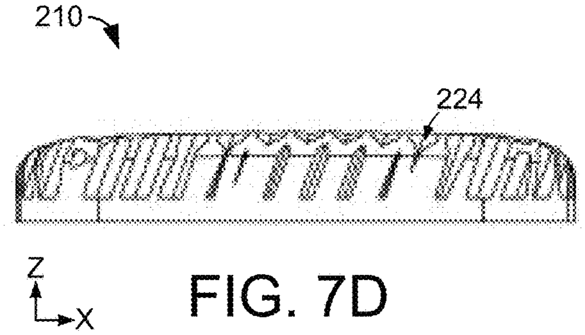
Figure 7C:
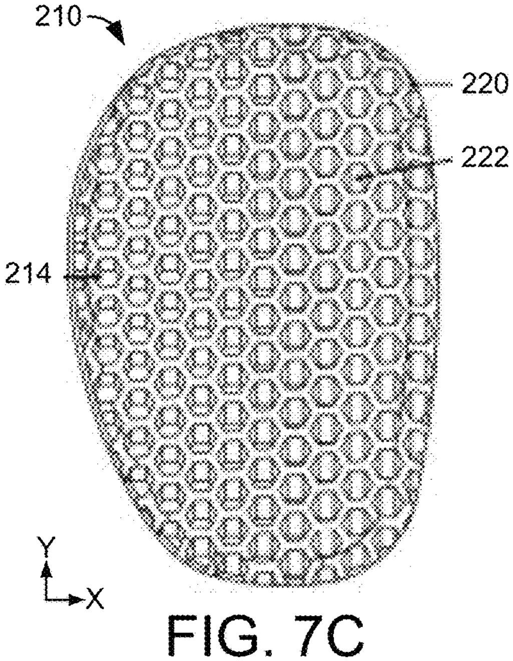

FIG. 7C shows a front plan view of the ear side of the insert 210 while FIG. 7D illustrates a side view of the insert 210. FIG. 7D depicts how some apertures 214/216 can be angled with respect to the Z axis, such as, but not limited to 5-45°. The combination of the varying insert thickness, as provided by the contoured top surface 224, and tuned aperture 214/216 characteristics allows frequency transition to be smoothed, standing waves to be mitigated, and resonance to be optimized to the structure of a user's ear.

Figure 8A:
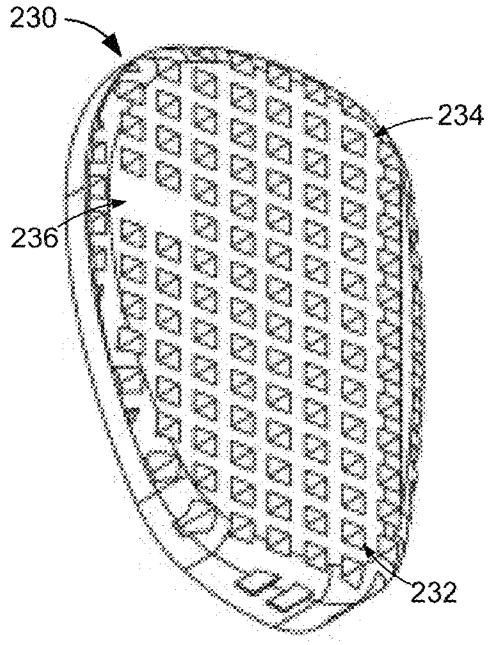
FIGS. 8A-8D respectively depict portions of an example insert that can be utilized in an acoustic diffusion and absorption system.
Figure 8B:
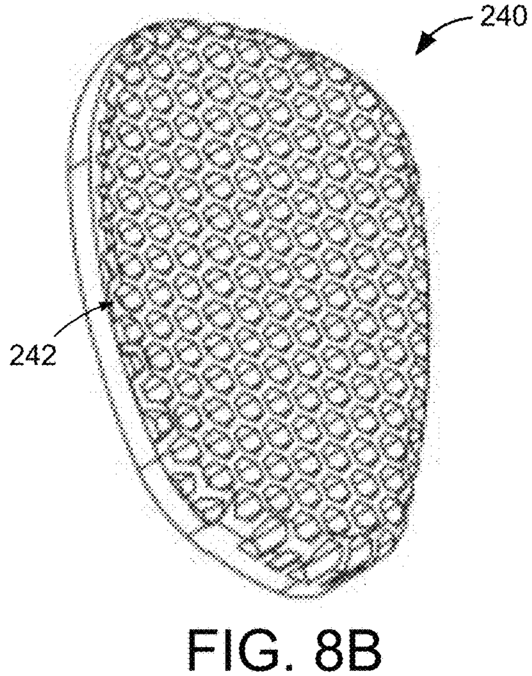

In FIGS. 8A and 8B, line representations illustrate assorted embodiments of an example insert. Insert 230 of FIG. 8A depicts a perspective view of an example insert 230 configuration where square channel 232 cross-sectional shapes along the X-Y plane are arranged in a uniform pattern 234, and associated channels that extend into the thickness of the insert, are employed in combination with a continuous surface region 236 that is void of apertures 232, which presents a larger area to diffuse energy, or which may contain additional filters underneath the solid surface, such as a longer quarter wave resonator or Hemholtz resonator. The uniform pattern 242 of hexagonal-shaped channels in FIG. 8B illustrate how the insert 240 can have partial and complete channel cross-sections.

Figure 8C:
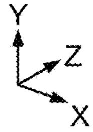
Figure 8C:
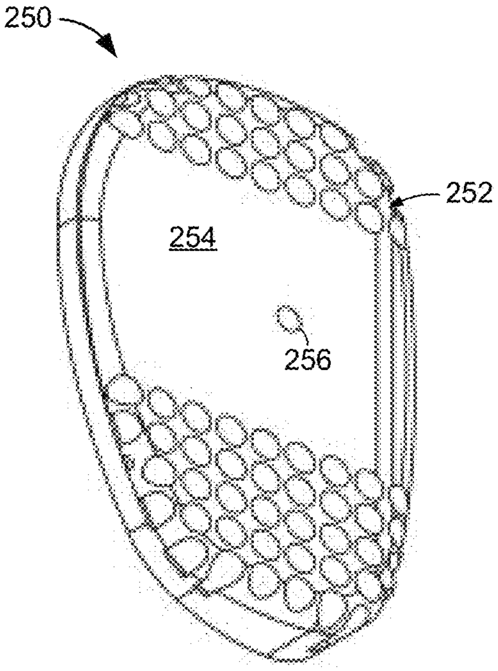

The example insert 250 of FIG. 8C illustrates how a uniform pattern 252 of separate channels can be bifurcated by a continuous surface 254 that tunes how acoustic energy reacts to the insert 250. It is contemplated, but not required, that the continuous surface 254 can have a port 256 that may match, or be dissimilar from, the other channels extending into the thickness of the insert 250.

Figure 8D:
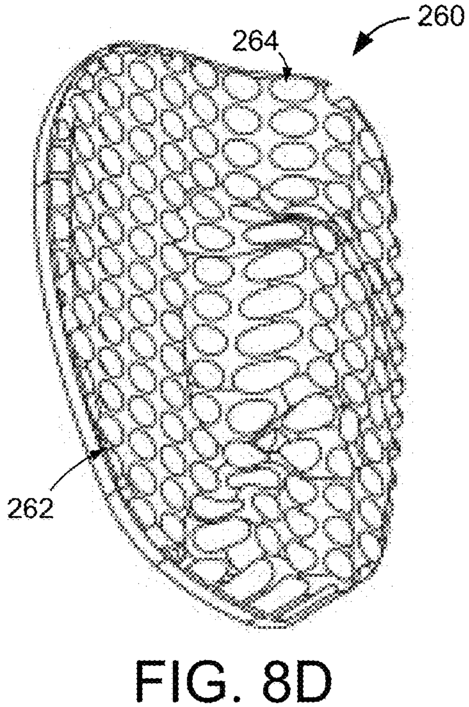

While the top surfaces of the inserts shown in FIGS. 8A, 8B, and 8C have a relatively smooth gradation of the surface, it is contemplated that relatively drastic undulations in top surface topography can be utilized. as shown in FIG. 8D. It is further contemplated that the top surface can be partially, or completely, coated with a porous-matrix.

Insert 260 of FIG. 8D illustrates such drastic undulations as the top surface 262 provides a number of localized protrusions, dips, and slopes that each vary the thickness of the insert 260 along the Z axis along with the length of the separate channels 264. It is noted that the relatively drastic top surface 262 topography may, or may not, alter the cross-sectional shape of some channels 264, in the X-Y plane.

Figure 9A:
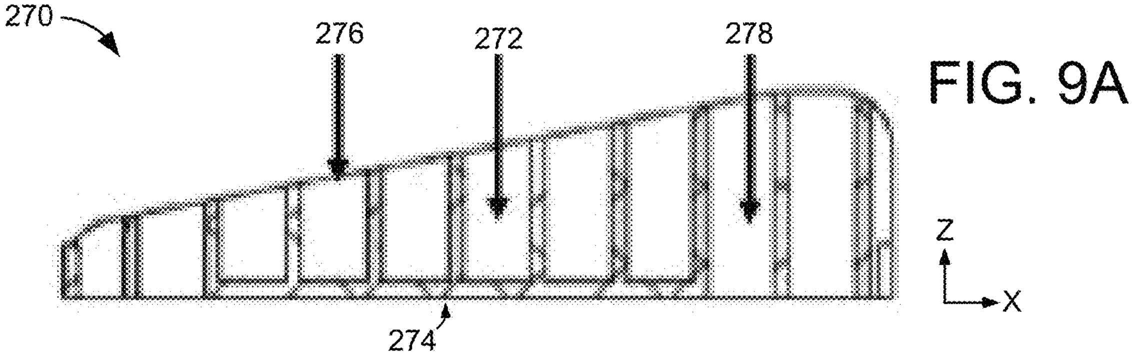
FIGS. 9A-9D respectively depict cross-sectional aspects of example inserts that can be employed in an acoustic diffusion and absorption system.
Figure 9B:
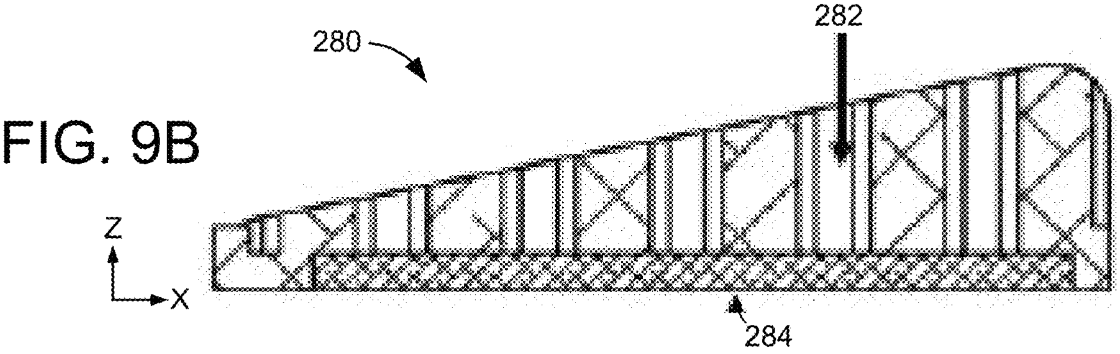

FIGS. 9A-9D respectively depict cross-sectional line representations of example inserts configured in accordance with various embodiments to be capable of optimizing acoustic energy transfer from a headphone audio transducer to a user's ear. Insert 270 of FIG. 9A shows an embodiment where closed channels 272 are configured as quarter-wave resonators by being terminated on the bottom, transducer side 274 of the insert 270. A continually sloped ear side, top surface 276 may be flat, contoured, or tapered to define a different depth for each channel resonator so that respective resonators have varying depth, as shown by insert 280 of FIG. 9B. The combination of different closed channels 282 with varying depth can complement an acoustic material 284 to manipulate larger parts of the acoustic spectrum as an array, while multiple aperture resonators of the same length may be combined to increase the depth of the resultant acoustic energy notch-filter.

It is noted there is no requirement for the closed channel 272/282 resonators to be vertically oriented or aligned in any way with the acoustic wave guides, and the waveguides may be curved or folded to increase their length to address lower frequencies. Further, a system design may incorporate any desired combination of quarter wave and Helmholtz closed channel 272/282 resonators to achieve desired acoustic energy manipulation, control, and transfer.

Figure 9C:
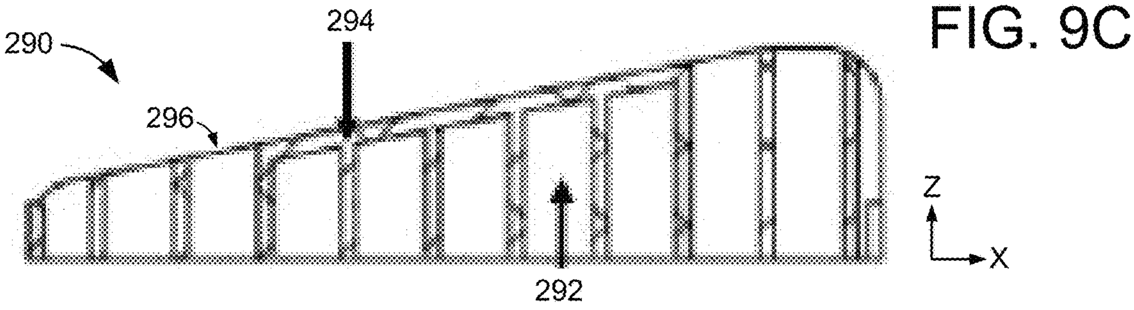

As displayed in FIG. 9C, an insert 290 can terminate closed channels 292 with a blocking surface 294 positioned on an ear side, top surface 296 to create an acoustic wave resonator. Such closed channel 292 inversion, compared to the apertures/resonators of insert 270, positions resonating acoustic energy proximal to the ear and away from the audio driver, which allows for the creation of large surfaces proximal to the ear which can either be coated with porous damping material or left as rigid material hard to be reflective as appropriate to the application. Also, it is noted that by placing the blocking surface 294 on the ear side of an insert, a notch-filter may be deployed prior to an acoustic wave entering the air volume, which results in a stronger filter effect at the acoustic wave source, particularly if impedance node 106 is present.

Figure 9D:
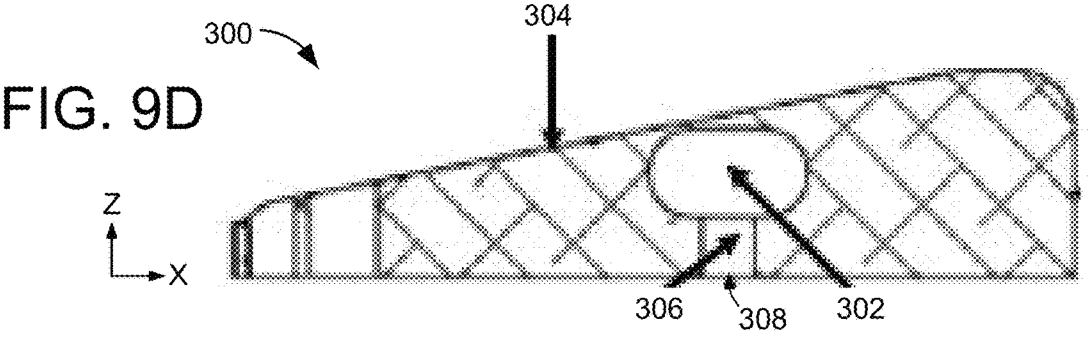

While not required or limiting, an insert 300 can be configured with a Helmholtz resonator. FIG. 9D shows how a Helmholtz resonator 302 can be embedded underneath a diffusion/reflection surface 304. As with a quarter-wave closed channel resonator, the Helmholtz resonator 302 may be terminated proximal to the driver or proximal to the ear. It is contemplated that a single Helmholtz resonator 302 is utilized in an insert that is otherwise solid and rigid, but some embodiments configure a plurality of resonators 302 separated throughout the insert 300. A Helmholtz resonator 302 can employ a channel 306 that can extend to the ear side top surface 304 or to the driver-side bottom surface 308, as shown.

The ability to route insert channels in a variety of different lengths and orientations allows for diverse frequency tuning. FIGS. 10A-10D respectively depict portions of an example insert 310 that can be utilized in a headphone in accordance with various embodiments. The insert 310 has a plurality of separated channels 312 that are arranged in a pattern within a continuous perimeter 314 and each extend through the entire thickness of a single piece of rigid material, along the Z axis. It is contemplated that one or more channels 312 are closed and do not extend through the entire thickness so as to create a resonator, but such arrangement is not shown, limiting, or required.

Figure 10A:
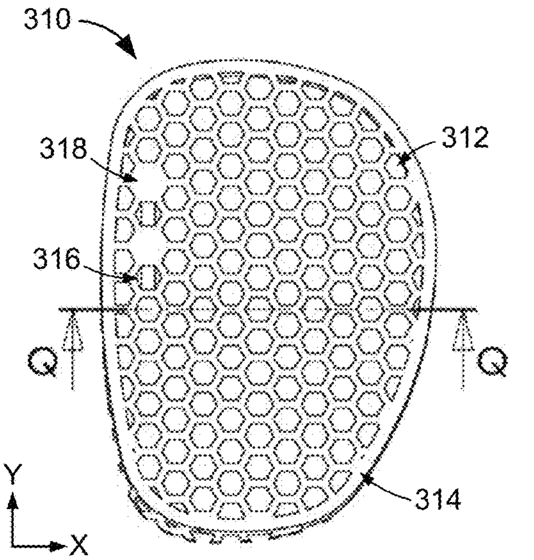
FIGS. 10-10D respectively depict aspects of an example insert configured in accordance with assorted embodiments.
Figure 10B:
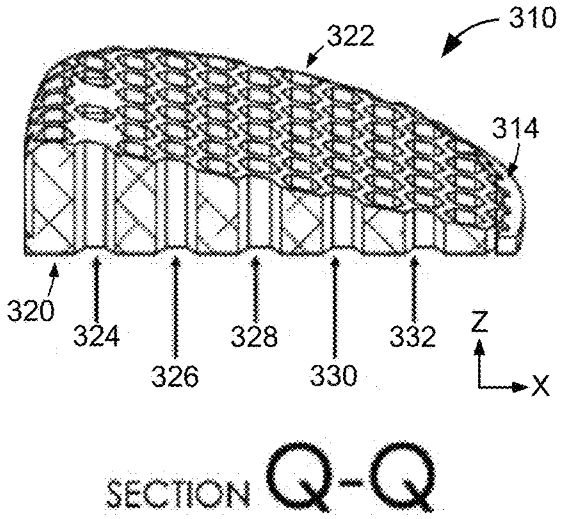

The driver-side view of FIG. 10A illustrates how two channels 316 correspond with a solid void 318 and are each defined by an acoustic tube that travels laterally along the X-Y plane, which can be characterized as a swept path channel. The cross-sectional view of FIG. 10B illustrates how the driver-side 320 of the insert 310 is flat and parallel to the X-Y plane while the ear side 322 of the insert 310 is contoured with multiple different surface orientations. The varying contour of the ear side 320 results in different channels 312 resulting in different lengths, as measured along the path length (Z axis), as shown with the Q-Q section of FIG. 10B.

In the non-limiting configuration of insert 310, channel 324 is approximately 9 mm long with the thickness of the insert 310 being 10 mm and corresponding to a half-wave resonator operating at approximately 9.6 KHz. Channel 326 can be arranged with approximately a 10 mm depth along the Z axis, which corresponds to approximately 8.6 KHz operating frequency while channel 328 has approximately an 8 mm depth that corresponds to 10.7 KHz operating frequency, channel 330 has approximately a 6 mm depth corresponding to 14.2 KHz operating frequency, and channel 332 has approximately a 4 mm depth that corresponds to 21 KHz operating frequency. Folded channel 316 can have a length of 15 mm that corresponds to a resonator frequency of 5.5 KHz.

It is contemplated that channels 312 with different configurations, such as length along the Z axis (depth), cross-sectional area along the X-Y plane, and total volume and/or orientation relative to the Z axis, provide a wide array of frequency range operating frequencies for quarter wave resonators that result in smoother acoustic transitions between frequencies than if a single operating frequency was utilized. It is noted that the combination of channel customization can be complemented by ear side surface geometry to create waveguides and/or resonators specific to frequencies of interest.

With the configuration of the ear side topography 322, the lower frequency limit of the insert 310 is not limited by the thickness of the insert 310 itself or channel 312. Lower frequency resonators may be created, in some embodiments, by making the insert 310 thicker so as to increase the depth/length of some channels 312, or by creating a waveguide or resonator path of the desired length that is longer than the thickness of the insert by curving, folding, or otherwise embedding, the longer resonator within the insert 310 to increase the effective resonator length, as shown in channels 336 the O-O cross-sectional view of FIG. 10C.

It is important to consider the potential of the channel 312 configurations as a resonator array able to create both highly targeted and broad-based frequency corrections within the range defined by the waveguides (open channels 312/336). As illustrated in the non-limiting cross-section O-O of FIG. 10C, an array of identical open channels 334 are each angled with respect to the Z axis and have a uniform cross-sectional shape/area from the driver-side 320 to the ear side 322, which provides a greater length than would be available if the channels 312 were parallel to the Z axis.

Figure 10D:
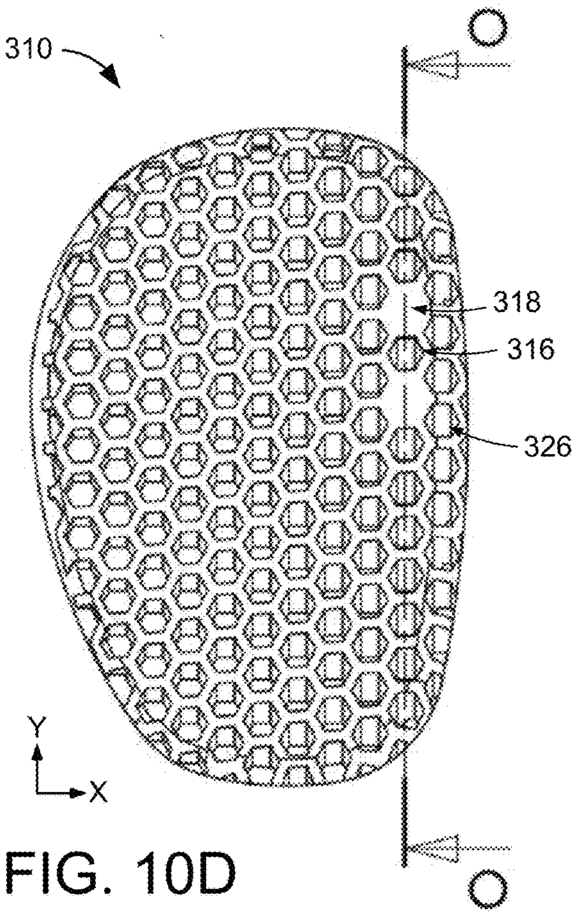

Any number of folding channels 336 can further extend the operative length of an open channel to form longer path lengths supporting lower frequency resonators, while adding parallel resonators increases the attenuation of the array, and changing hard termination to impedance nodes and porous-matrix material lower filter Q and attenuation. The plan view of the ear side 322 of the insert 310 in FIG. 10D shows how the folded apertures 336 produce the same solid voids 318 as the driver-side 320 as a result of the lateral travel of the aperture tube.

Figure 11A:
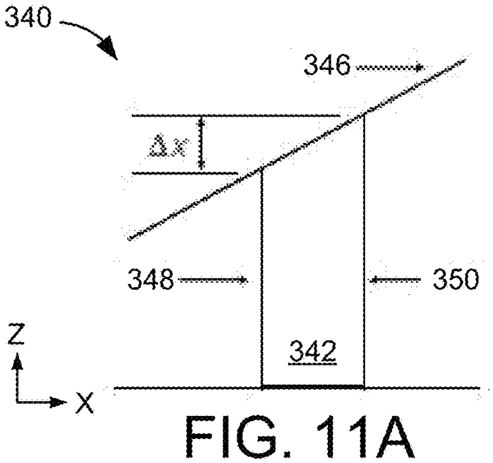
FIGS. 11A and 11B respectively illustrate portions of an example insert arranged in accordance with some embodiments.
Figure 11B:
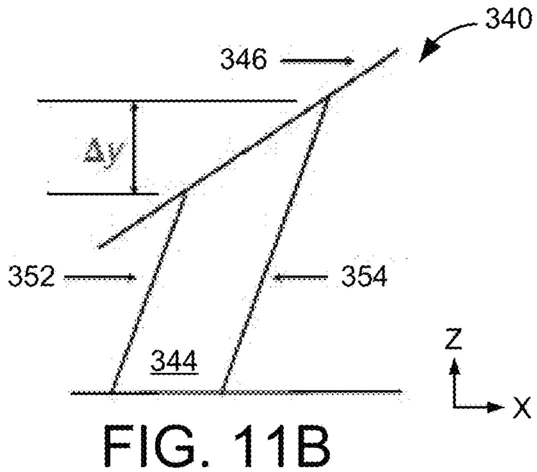

FIGS. 11A and 11B respectively illustrate portions of an example insert 340 that can be constructed and operated in accordance with assorted embodiments. It is noted that the configuration of a channel with sidewalls parallel to the Z axis, as shown by the aperture 342 of FIG. 11A, or with sidewalls angled relative to the Z axis, as shown by aperture 344 of FIG. 11B, controls the Q factor. In quarter-wave resonator designs where a channel does not extend completely through the thickness of the insert 340, it is possible to adjust the Q by varying the depth of the sidewalls that define the resonator. The larger the differential in the sidewall depth, the lower the Q and the shallower the resulting filter.

The example channel 342 of FIG. 11A shows how the slope of the top surface 346 creates Δx by shortening one resonator sidewall 348 relative to the opposite sidewall 350. The example aperture 344 of FIG. 11B shows that, by angling the resonator relative the top surface 346, Δy is formed by the difference in resonator sidewall heights 352 and 354. It is noted that if the sidewall height 348 is equal to sidewall height 350 and the slope of the top surface 346 is less for aperture 342 than for aperture 344, which equates to Δx being less than Δy, Δy has a lower Q factor.

Figure 10C:
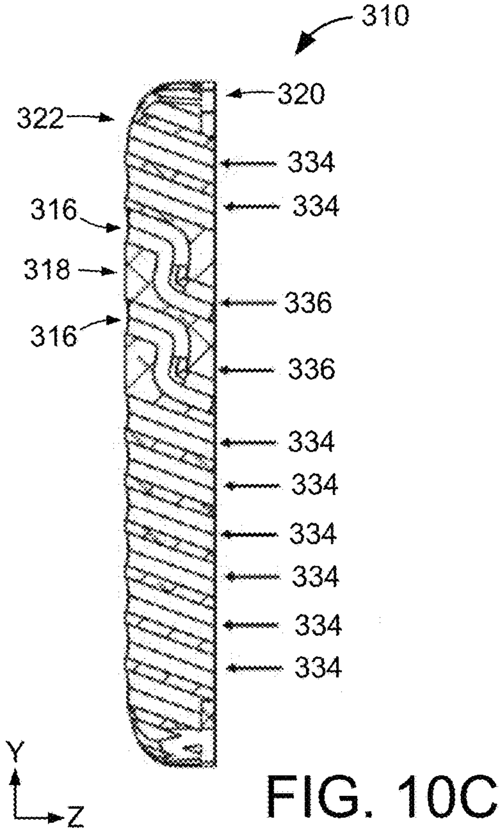

As shown in FIG. 10C, the non-limiting embodiment of multiple resonators 334 of a given depth may be deployed to increase attenuation at the target operating frequency. To select a broader array of frequencies, a horizontal selection of channels, as shown in FIG. 10B, shows a pattern of decreasing depth along the horizontal axis (X axis), and when terminated may form resonators of increasing frequencies until they reach ultrasonic wavelengths. This creates a novel design whereby the insert designer can deploy multiple identical filters to increase attenuation at the target frequency as well as a wide array of target frequencies, while precisely tuning filter Q and attenuation to create notch, or overlapping, broadband filters.

As a result of the tuned configuration of the assorted apertures of a single-piece insert, acoustic energy absorption and diffusion are combined to provide custom acoustic wave transmission as a generic aspect of an insert optimized for a particular user's ear. It is noted that an insert does not, necessarily, fill an entirety of a headphone ear cup or wholly cover the transducer, although driver coverage of at least 50% ensures more effective system operation. Incomplete coverage of the transducer, or baffle around the transducer, can produce empty, non-filled space or space for secondary waveguides/resonators or simple acoustic foams or felts.

Figure 12A:
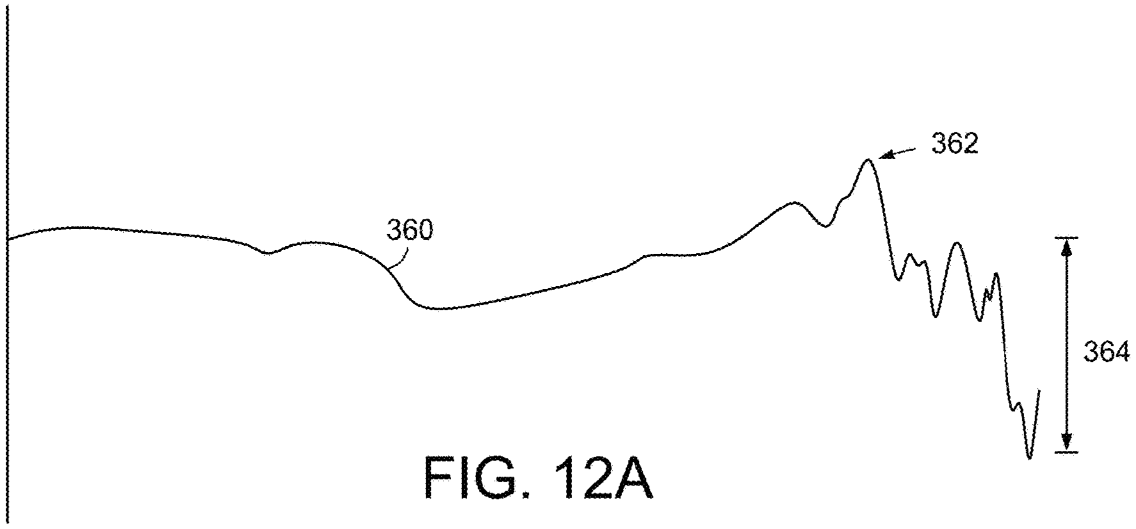
FIGS. 12A and 12B respectively plot operational data from an acoustic system utilized in accordance with various embodiments.

Operational data 360 of FIG. 12A are from a planar magnetic audio transducer headphone measured on a GRAS 45CA without an insert with tuned apertures where the audio transducer is generating an audio pressure wave that passes through a compression chamber and impedance node. The data 360 have a pronounced peak 362 at approximately 5.8 KHz. Above 10 KHz, the frequency response is very irregular, which is characteristic of complex standing waves, as illustrated by range 364.

Figure 12B:
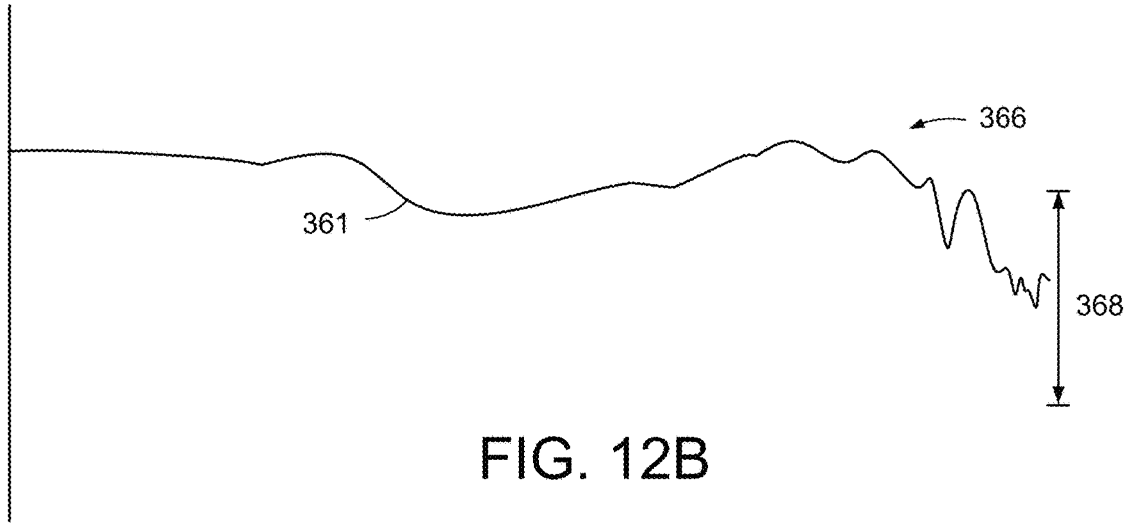

Through the addition of an insert tuned in accordance with assorted embodiments, frequency response is optimized, as shown by operational data 361 of FIG. 12B. It is noted that the exact same headphone is used for data 360 and 361 with the same GRAS 45CA audio equipment. Data 361, however, corresponds with an impedance node and porous-matrix material positioned proximal to a tuned insert including at least one folded closed aperture to target the 5.8 Khz peak 362 of FIG. 12A. It is noted that two folded 5.8 KHz resonators can pull 5 dB out of the operational frequency curve, as shown by region 366, which displays a smooth, continuous response in the region of interest with a complete absence of the standing wave clearly present in peak 352.

The amplitude swings in range 364 are considerably smoothed in range 368 through the use of the tuned insert, and the tuned array of resonators terminate with hard blocking surfaces address 5.5 and 8-10 KHz. Multiple shorter apertures of varying length are terminated with an impedance node and porous-matrix material layers to create overlapping low Q filters that smooth frequency response above 10 KHz. Finally, a degree of diffusion is created by wave diffraction off an ear side top surface of the insert with contours and closed/open space ratios being used to modify the effect, which can be customized to be user and application specific.

Figure 13:
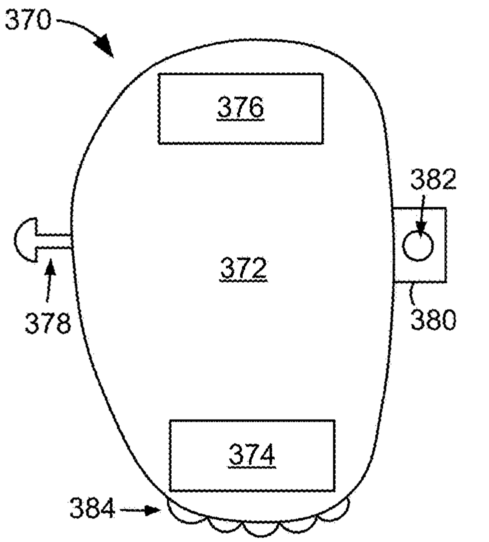
FIG. 13 depicts a line representation of portions of an example insert configured and utilized in accordance with various embodiments.

FIG. 13 depicts portions of another example insert 370 that can be utilized to condition acoustic waves in accordance with various embodiments. The insert 370 has a rigid body 372 that can support one or more attachment features. While not required or limiting, an adhesive 374 may be applied to the insert body 372 to allow for selective incorporation into a headphone ear cup or ear pad. Some embodiments provide an adhesive in the form of a sticker 376, which may be employed alone or in combination with other physical attachments to a headphone ear cup or ear pad.

One or more attachment features may extend from the insert body 372 to facilitate connection between an audio driver and a user's eardrum. For instance, a keyed protrusion 378 may engage a keyed aperture in a headphone to allow the insert body 372 to be securely retained. A flexible, or rigid, tab 380 may extend from the insert body 372 and present one or more fasteners 382, such as a button, screw, pin, or tie. It is contemplated that any number of different attachment features can be utilized to physically secure the insert body 372 onto, or inside, a headphone ear cup or ear pad.

Figure 14:
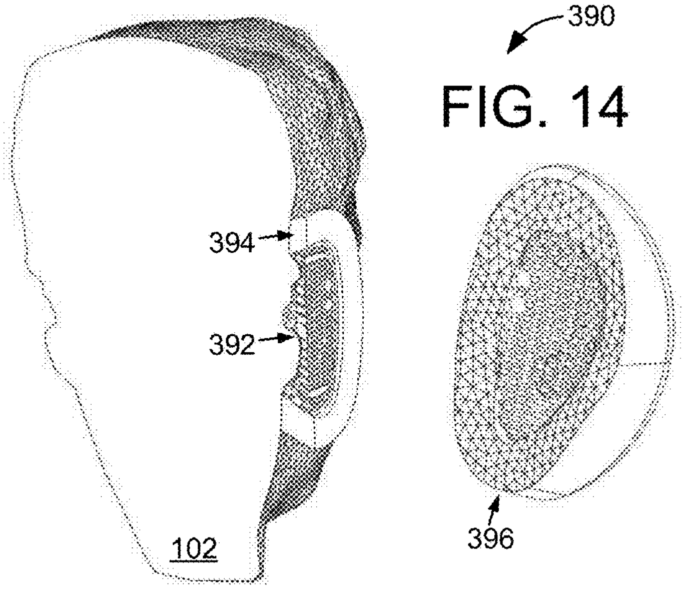
FIG. 14 depicts a perspective view of an example headphone system arranged in accordance with some embodiments.

FIG. 14 depicts a partial cross-sectional view of portions of an example headphone system 390 that employs an acoustic wave conditioning insert 392 positioned inside an ear pad 394 proximal the ear of a user 102. It is understood that layers 196/198, the transducer, and the remainder of the headphone coupler are not shown in FIG. 14 for the sake of clarity. In the majority of cases, the insert assembly will be attached directly to the transducer and/or baffle assembly holding the transducer, but in accordance with some embodiments, the insert 392 can be incorporated into, or attached to, the ear pad, as illustrated by pad 396. Regardless of how the insert 392 is connected headphone coupler, the positioning of the insert 392 between an audio transducer and the user's ear allows the tuned waveguides, resonators, and diffusion structures of the insert 392 to optimize the transfer of acoustic waves to the user 102.

Figure 15A:
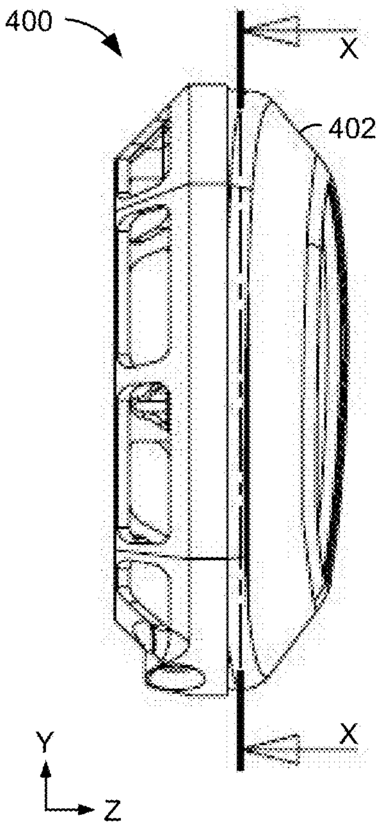
FIGS. 15A-15D respectively depict portions of an example ear pad that can be employed in assorted embodiments.

FIGS. 15A-15D respectively depict portions of an example ear pad 400 that can be employed in a headphone in accordance with various embodiments to provide acoustic waveguide, diffusion, and absorption. The side view of FIG. 15A shows how the ear pad 400 can have a unitary body 402 that may be constructed of one or more materials to surround the ear of a user. It is contemplated that the ear pad is fabricated as a single piece via 3D printing or molding. The ear pad can be created as a waveguide embedded within the foam core of an ear pad. Such methods allow one or more channels, such as an open waveguide, closed resonator, or tuned length sound tube, to be incorporated into the ear pad

400 without attachment of a separate insert to support lower frequency attenuators than may be directly integrated into the acoustic metamaterial tuning system.

Figure 15B:
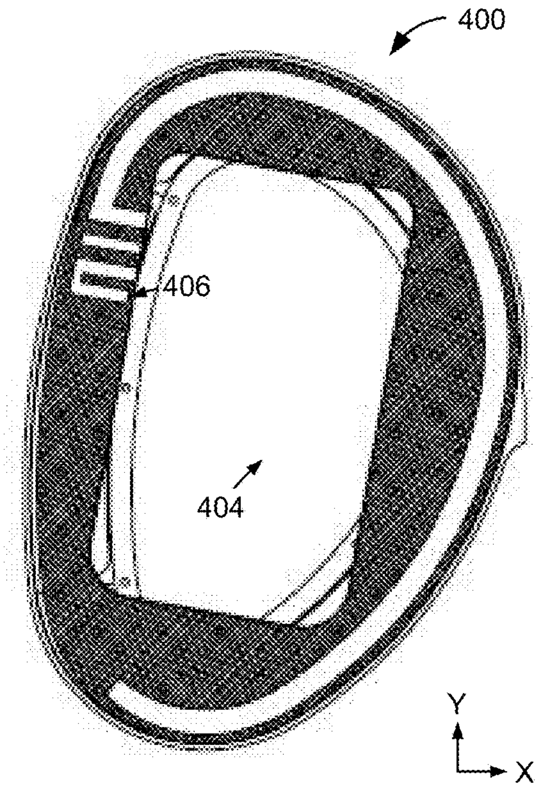

The cross-sectional view from plane X-X in FIG. 15B illustrates the ear-facing side of the ear pad 400. The ear pad 400 has a centrally located ear aperture 404 that is surrounded by an ear structure 406 where one or more acoustic tuning features can be positioned. The ability to incorporate acoustic waveguide and/or resonator channels into the ear pad 400 allows for optimal user comfort and acoustic performance that can be changed by switching between different ear pads 400 along with the ability to use very long resonators to address frequencies down to 50 Hz. That is, embodiments configure the ear pad 400 to be interchangeable to different ear couplers and/or headphones, which allows different acoustic features to be installed with the attachment of an ear pad 400 to an ear coupler of a headphone.

Figure 15C:
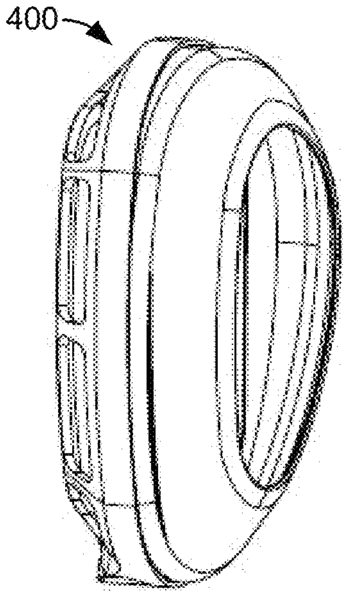
Figure 15D:
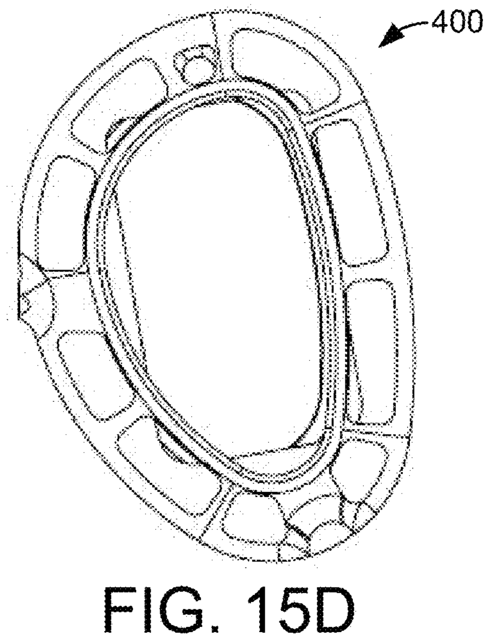

FIGS. 15C and 15D respectively depict how a resonator can be incorporated into an ear pad 400. It is contemplated that any waveguide, resonator, impedance node, and/or porous-matrix acoustic tuning can be attached or built-in the ear pad. Some embodiments of an ear pad 400 allows acoustic tuning aspects to be interchangeable without removing the ear pad 400 from a headphone. Other embodiments allow acoustic waveguide, resonators, impedance nodes, and/or porous-matrix aspects to be attached, or removed to a headphone system through the interchanging of an entire ear pad 400 from an ear cup, as generally shown in FIG. 1.

Figure 16A:
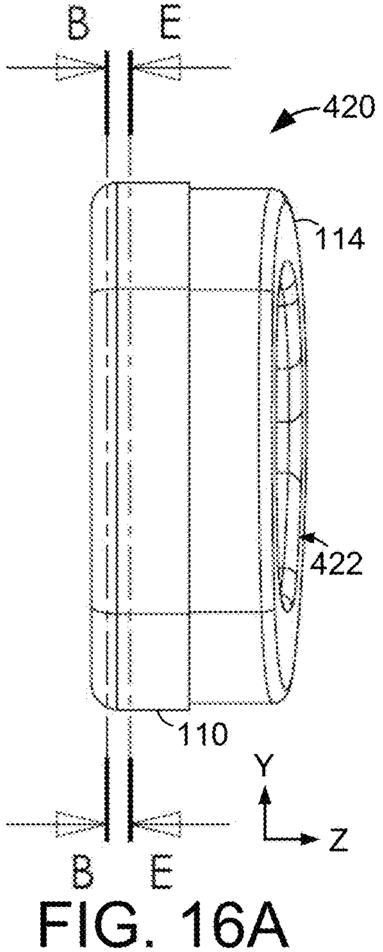
FIGS. 16A-16D respectively illustrate portions of an example ear cup configured in accordance with some embodiments to optimize a headphone.
Figure 16B:
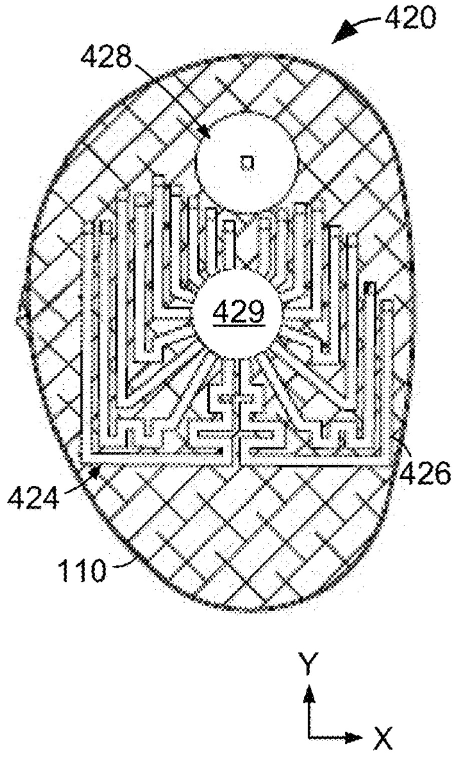

FIGS. 16A-16E respectively depict aspects of an example headphone 420 that is configured in accordance with various embodiments. In the side view of FIG. 16A, an ear coupler 110 is attached to an ear pad 114 that surrounds an ear recess 422 with a closed, or semi-closed, configuration that creates a volume of air behind the driver 434. It is contemplated that the ear coupler 110 houses one or more acoustic drivers and is maintained in position on a user's head by at least one headband, as shown in FIG. 1. As compared to closed ear cups, housings, or bodies, embodiments of the ear coupler 110 with a closed, or semi-closed, configuration that provides integrated resonators 424 where separate channels 426 that are positioned behind the driver 434 act as quarter wave resonators and/or Helmholtz resonators to absorb acoustic energy that is otherwise stored within the volume enclosed by the coupler 110, as shown in FIG. 16B.

The B-B cross-section of FIG. 16B further shows how the respective channels 426 are combined in a pattern of different tuned channel lengths to provide absorption across a frequency range and/or for a specified frequency for passing sound waves. Also integrated into the ear coupler 110, or otherwise placed within the volume defined by the rear cup portion of the coupler 110, as illustrated in FIG. 16B, is a Helmholtz resonator 428 with an aperture 429 allowing air to enter the volume defined by the rear cup portion of the ear coupler 110 for targeted absorption of acoustic energy.

While not limiting or required, the ear coupler 110 can be printed, molded, or otherwise formed as a unitary body, or multi-part assembly, with one or more channels 426 continuously extend within the coupler 110 to any number of ports 429 located on the interior side of the coupler 110, facing the driver/transducer of the headphone 420, as shown in FIG. 16B, which is along the B-B cross-section of FIG. 16A. The array of waveguides 424 comprise multiple lengths and cross-sectional areas to address absorption of a broad spectrum of acoustic frequencies, as previously described. It is noted that the respective ports 429 can be configured with unique, or uniform, sizes and shapes that provide a designer an ability to tune how airflow enters the ear recess 422 for use by one or more acoustic drivers/transducers.

Figure 16C:
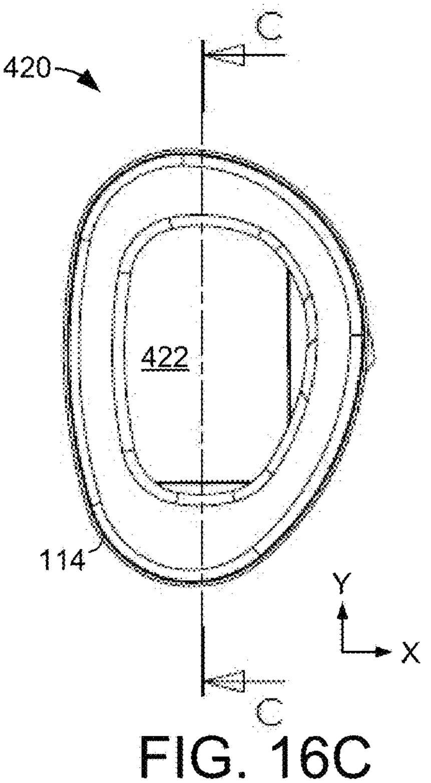
Figure 16D:
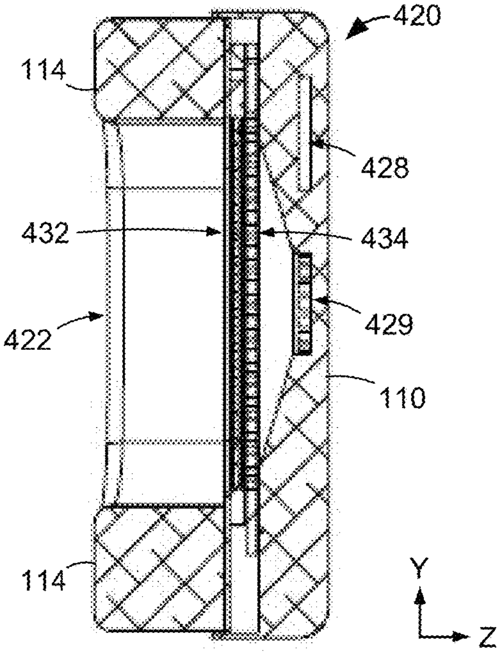

FIG. 16C depicts an ear side profile of the headphone 420 and illustrates how the ear pad 114 can continuously surround and define the ear recess 422. Various embodiments of the headphone 420 configure the coupler 110 with one or more channels configured as quarter wave, or Helmholtz, resonators to tune the acoustic frequency response and presence of standing waves within the volume of air between the transducer and coupler 110. Along cross-section C-C, FIG. 16D depicts a non-limiting example of how a metamaterial insert 432 can be positioned within the volume of air between an acoustic driver 434, such as a planar magnetic or electrostatic transducer, and the rear wall of the ear coupler 110. FIG. 16D further illustrates how the driver 434 placement within the ear coupler 110 provides open space and distance between the ports 429 to the resonators 426/428, which can varied and tuned to optimize driver 434 operation, frequency range, and frequency response.

In some embodiments, the waveguide channels 426 are characterized as resonators, which can be positioned parallel to the driver 434 while other embodiments orient the channels/resonators 426 vertically, or at arbitrary angles, with respect to the driver 434. In other words, placement of channels/resonators 426 is non-limiting and may be proximal to the driver 434, as shown, where ports 429 are within the areal extent of the driver 434 or where channels/resonators 426/428 can be perpendicular, or otherwise oriented, relative to the driver 434.

It is contemplated that the channels/resonators 426/428 directly couple to the driver 434 or are separated from the driver 434 by an air gap, as shown, with optional use of poro-acoustic materials placed within the volume. The ability to tune the position of the driver 434, configuration of the damping insert 432, and configuration of the channels/resonators 426 allows for sophisticated acoustic control that is customized to the ear topography of a user to provide optimized frequency response, range, and amplitude.

Figure 17A:
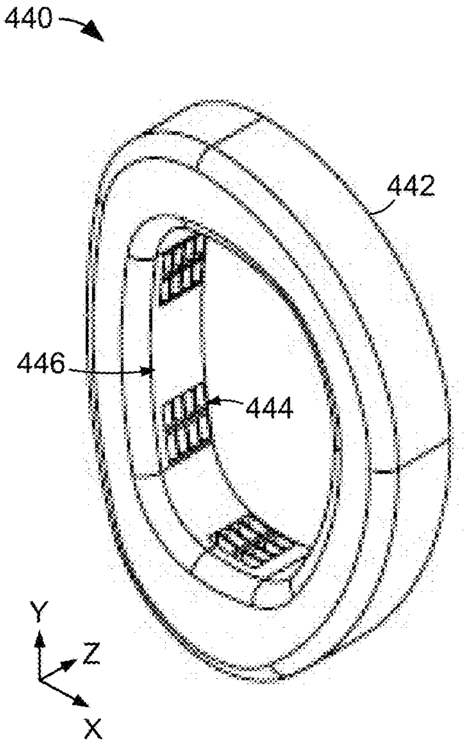
FIGS. 17A-17D respectively display portions of an example ear pad that can be utilized in a headphone in accordance with various embodiments.

FIGS. 17A-17D respectively depict portions of an example ear pad 440 that can be employed as part of a headphone in various embodiments to provide enhanced acoustic performance. By printing, or otherwise fabricating, an ear pad 440 as a unitary structure or multi-part assembly, relatively intricate metamaterial structures can be incorporated into the pad body 442. The perspective view of FIG. 17A shows how the pad body 442 can be configured with a shape and size that is conducive to surrounding the ear of a user. It is contemplated that the pad body 442 is arranged to fit atop a user's ear with apertures placed around the interior surfaces of the cavity defined by the inner wall of the ear pad 440, the ear, as well as the coupler and driver.

The ear pad assembly 440 provides acoustic wave manipulating channels 444 along an inner body surface 446, which positions each aperture 444 into the cavity defined by the user's ear and the acoustic wave source(s) of an ear coupler and driver assembly that is attached to the pad 440. It is noted that the respective channels 444 of the ear pad 440 are separate and respectively tuned as quarter wave, or Helmholtz, resonators to mitigate the degradation of acoustic properties.

Figure 17B:
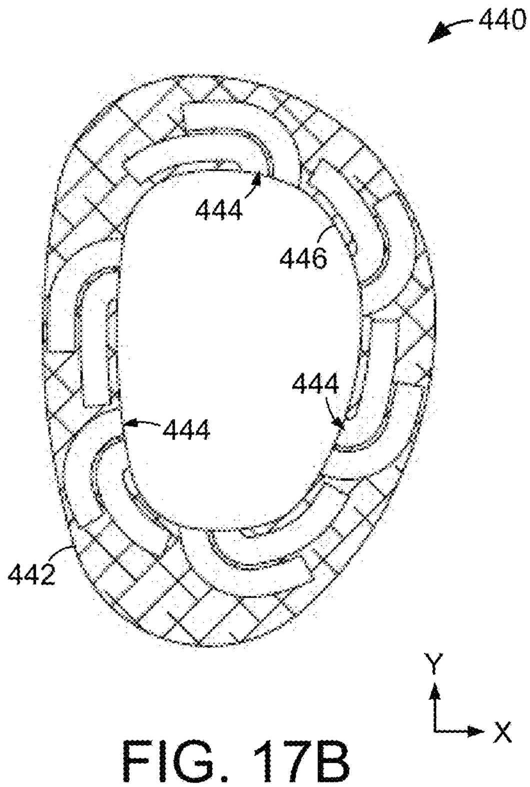

Unlike the inline resonators that are also waveguides, channels 444 are purely for implementation as various resonators. The cross-sectional view of FIG. 17B illustrates how, when configured as quarter wave resonators, the respective channels 444 are hollow and terminate at a predetermined length from the inner body surface 446. The tuning of the size, length, and position of the various channels 444 allow a designer to provide unique, or redundant, structures to control how air and acoustic energy are transferred from source to a user's eardrum.

Figure 17C:
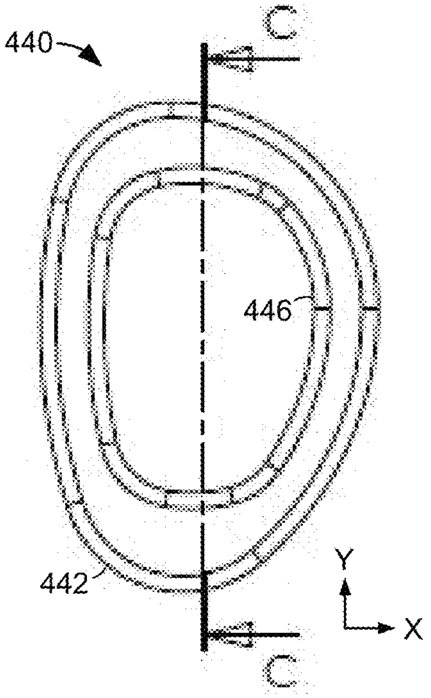
Figure 17D:
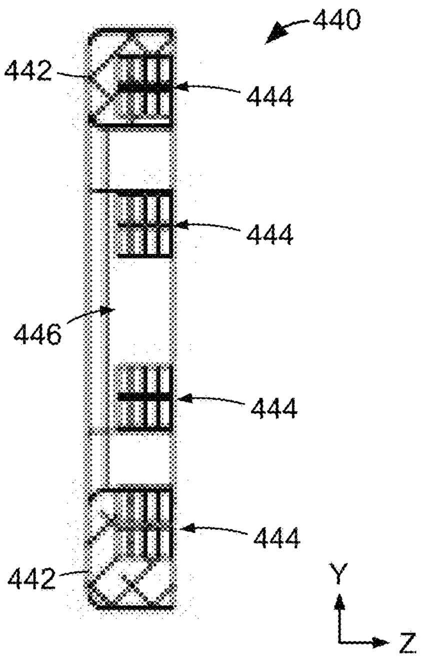

The plan view of FIG. 17C shows cross-sectional line C-C from which the cross-sectional view of FIG. 17D is taken. The view of FIG. 17D shows how multiple channels 444 can be grouped in close proximity, which forms a three dimensional matrix, on the inner body surface 446 without connecting to each other. Yet, some embodiments configure one or more pad channels 444 to extend from multiple inner surface 446 ports. Hence, a channel 444 can further be customized for how it engages the exterior surface, or interior volume of the pad assembly 440.

Figure 18:
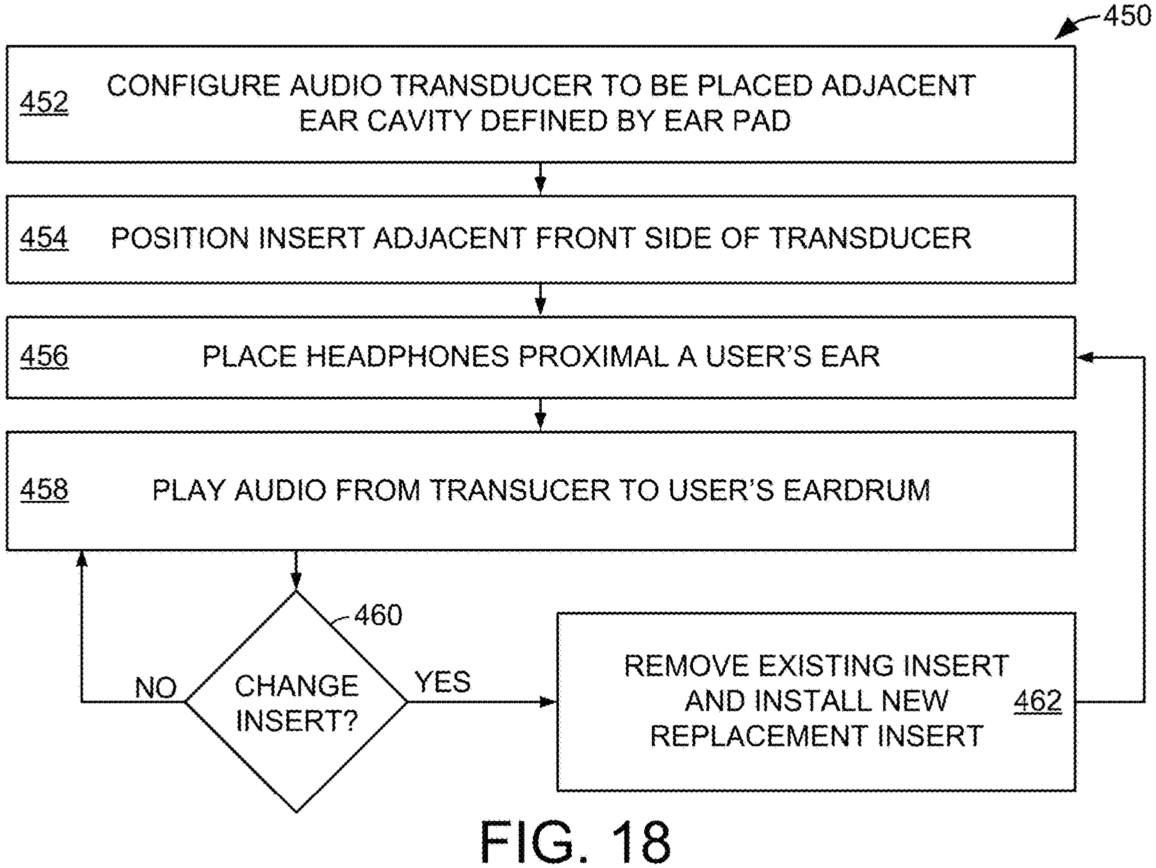
FIG. 18 is a flowchart of an example insert utilization routine that may be carried out with assorted embodiments of FIGS. 1-17D.

The flowchart of FIG. 18 depicts an example acoustic insert utilization routine 450 that can be carried out with the assorted embodiments of FIGS. 1-17F. Initially, a headphone system is provided in step 452 with at least one audio transducer configured to be placed adjacent an ear cavity of the user, the ear cavity bounded by an ear pad that engages the user's ear as described above.

One or more acoustic inserts are attached, installed or otherwise incorporated into the headphones, with the insert (s) positioned adjacent the front side of the transducer so as to be disposed between the transducer and the eardrum of the user. The headphones are thereafter placed onto (e.g., worn by) the user at step 456, and an audio input signal is supplied to the transducer at step 458 to play audio to the user (e.g., transfer audible information via sound waves such as music, spoken text, etc.).

While the acoustic insert(s) may be permanently incorporated into the headphones, it is contemplated that the insert(s) may instead be removably replaceable with other inserts having different configurations and response characteristics to accommodate the needs of different users and/or types of audible information transferred by the transducer. As such, FIG. 18 continues with decision step 460 where an evaluation is made to determine whether a different acoustic insert is in order. If so, step 462 proceeds with the removal of the existing insert and replacement thereof with a new insert before returning to step 456.

In accordance with at least some of the foregoing embodiments, a volume of material is placed between the audio transducer of an over-ear headphone and the listener's ear to create a system to control high frequency standing waves. The system is comprised of one or more of the following elements: audio diffusion, acoustic metamaterial, waveguides, and acoustic resonators. Diffusion is created either by reflection off the surface of the material or passing the audio wave through a diffusion matrix material such as a non-limiting example of foam or gyroid. A perforated surface between the transducer and ear reflects a portion of the reflected wave energy back to the ear while the balance re-enters the waveguide and/or resonator channels. A complex structure like a gyroid provides very high levels of diffusion without much surface area. The two approaches may be combined or used separately to manage diffusion.

The diffusor surface may be sculpted to move the diffusion surface closer to the ear to shift standing waves to higher frequencies, possibly in the ultrasonic frequencies. This may be shaped to conform to an average ear to minimize the gap between the insert and the ear. A 3D scan of an ear may be used to customize the diffusor surface to be specific to an individual. The surface of the structure may be regular with a steady sloped or domed geometry, or irregular and contoured to more closely mirror the geometry of an average ear.

Waveguides are terminated at either end by perforations in the structure. The perforations may be identical on both ends, or vary in size and shape. The channel between the terminations may be uniform in area, or modulated in area to serve as a waveguide. The channel may be straight, folded, or curved. The channels may be terminated to create a quarter wave or as a Helmholtz resonator embedded directly into the structure, allowing targeted filtration of specific standing waves which diffusion alone can't control. By embedding a plurality of resonators into a diffusion structure it is possible to provide both broad and fine-tuned control of resonances at one or more frequencies and of variable Q.

It is possible to incorporate the physical structure of the resonator into the diffusion pattern of the assembly, either by terminating airflow structures within the assembly or creating structures of varied shape underneath the diffusor surface. The diameter of the audio transmission tubes may be varied to adjust the acoustic impedance seen by the driver to control damping. Using complex tube geometries, tubes can be folded/extended to arbitrarily longer lengths so that when terminated to function as quarter wave or Helmholtz resonators they enable filtration of lower frequencies than could be supported strictly by using straight tubes. A 3D printed or conventional ear pad with the diffusion/absorption system built in is also possible.

Embedding resonators in the ear pad itself allows for potentially significantly longer resonators to address lower frequency resonances than could be handled in the more limited volume between transducer and ear. A multiplicity of terminated tubes of different lengths can be used to create a metamaterial damping system that controls the frequency response of a broad region of the audio spectrum, or to fine-tune multiple regions of the spectrum to achieve a desired result. Variable tube length is inherently possible in any structure of adequate volume to support the appropriate channel for a quarter wave resonator or volume for a Helmholz resonator. The diffusion and absorption system may be attached to the driver, driver baffle, or directly integrated into an ear pad constructed using conventional or 3D printing methods. Orientation and geometry of tubes can be altered to form wave guides to direct energy to specific parts of the ear structure and/or alter frequency response or to create special effects.

Utilization of impedance nodes and porous-matrix materials between the transducer and the tuning system or between the tuning system and the ear can substantially improve system performance by turning waveguides into dual-function devices that are both waveguides and resonators. This gives the system designer unparalleled flexibility to balance waveguides and resonators for precision tuning. The contour of the diffusion surface may be sloped and the angle of the resonators relative to the surface modify the Q of quarter-wave resonators embedded within the structure. The slope and angle work together to decrease the height of one side of the resonator relative to the other, which lowers the Q of the resonator of the system, resulting in a lesser amplitude affect across a broader range of frequencies. A 3D lattice and/or gyroid may be incorporated into the design to create an alternate method of diffusion beyond surface reflections noted above.

The present discussion will now turn to a review of further embodiments directed to the use of a rear side acoustic tuning structure. The rear side acoustic tuning structure can be used in lieu of, or in combination with, a front side insert as variously discussed above.

Figure 19:
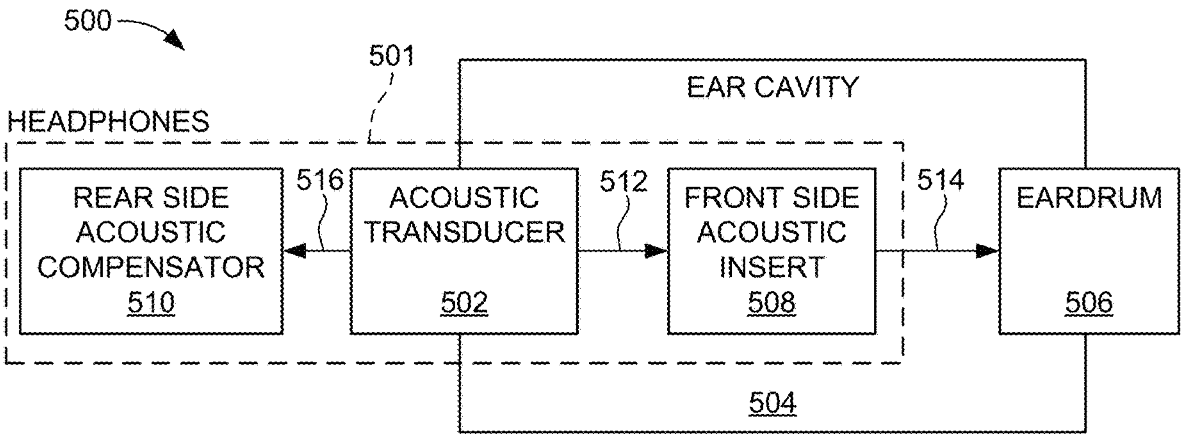
FIG. 19 is a functional block representation of another acoustic system constructed and operated in accordance with further embodiments of the present disclosure.

To this end, FIG. 19 provides a simplified functional block representation of another acoustic system 500. The system 500 includes a set of headphones 501 adapted to be worn by a user. The headphones 501 have an acoustic transducer (driver) 502 placed adjacent an ear cavity 504 of the user for transmission of audio information to an eardrum 506 of the user.

The headphones 501 further include a front side acoustic insert 508 and a rear side acoustic compensation structure 510. The front side acoustic insert 508 is optional and need not be included within the system 500. If used, the front side acoustic insert 508 substantially operates as described above to modify transmitted sound waves 512 from the front side of the transducer 502 to provide conditioned sound waves 514 to the eardrum 506 with desired audio characteristics.

The rear side acoustic compensation structure 510, herein also variously referred to as a rear side structure, a rear side compensator, etc., provides further audio conditioning by absorbing and/or cancelling sound waves 516 emitted by the rear side of the transducer 502. To this end, the rear side acoustic structure 510 incorporates one or more metamaterial resonator arrays that are coupled to the rear side of the transducer 502, such as within an ear cup portion of the headphones 501. Other acoustically responsive elements may be incorporated as well.

The structure 510 provides an open field type of response so that at least selected spectra of the primary source waves from the transducer (e.g., waves 516) are absorbed and provide essentially no reflectance back into the system. A number of alternative configurations are contemplated and will be discussed in turn below. Both selected frequency suppression and standing wave mitigation are provided along dual compensation paths.

Figure 20:
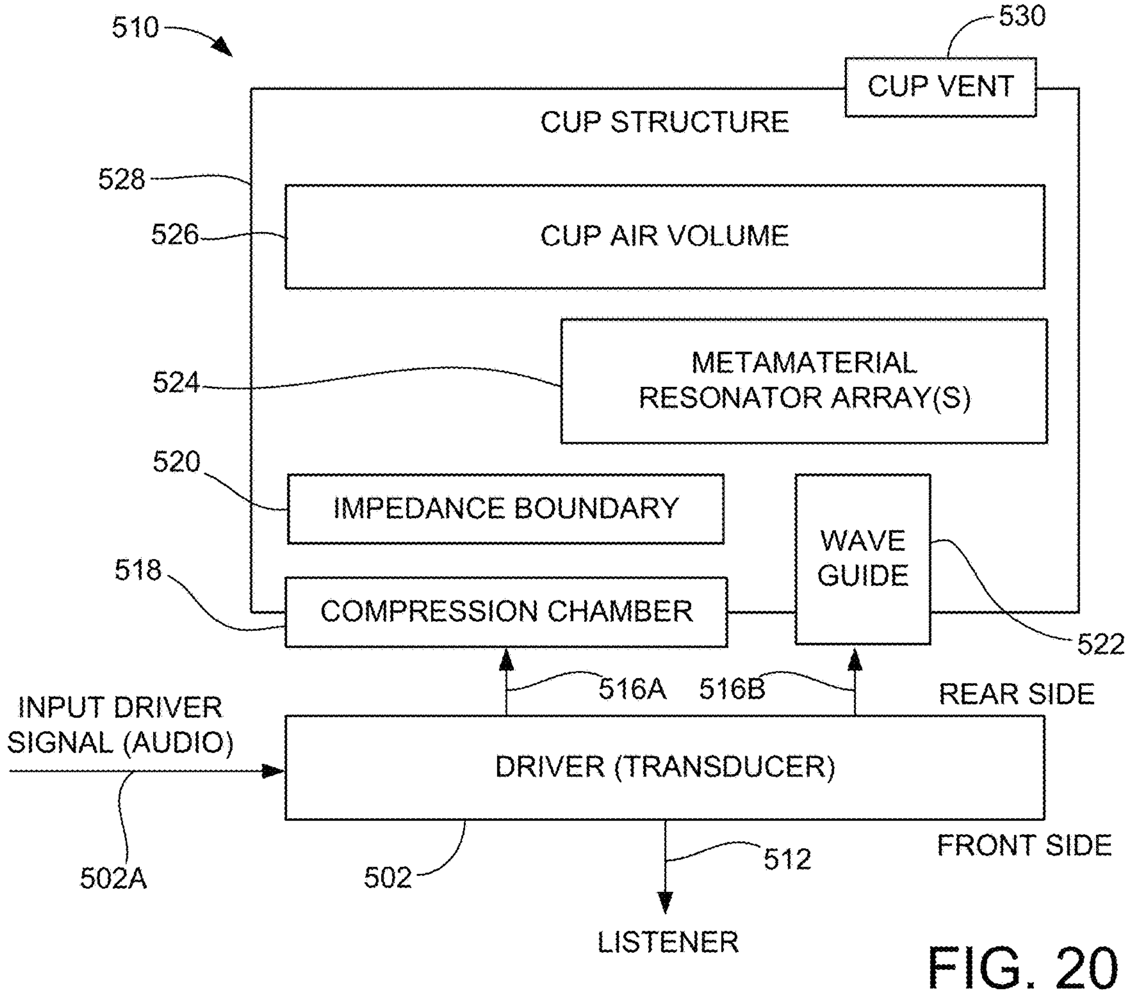
FIG. 20 is a functional block representation of a rear side acoustic structure shown in FIG. 19 in accordance with some embodiments.

FIG. 20 provides a simplified schematic representation of the rear side acoustic structure 510 from FIG. 19 in accordance with some embodiments. Other arrangements can be used so it will be understood that FIG. 20 is a top level diagram to illustrate various elements that can be incorporated into a particular configuration as required. Not all configurations will use all of the elements shown in FIG. 20.

An input driver signal is supplied to the driver (transducer) 502 via a conductive path 502A. The input driver signal may take the form of an analog multi-spectral electrical signal having frequency components that correspond to audibly detectable informational content to be conveyed to the user.

The driver 502 uses a voice coil or similar arrangement to transform the electrical signal into a corresponding mechanical motion of a diaphragm which concurrently emits both forward directed sound waves (e.g., waves 512) and rear directed sound waves (e.g. waves 516A, 516B). For clarity, the rear side acoustic structure 510 is integrally connected to the driver 502 to provide a combined transducer and compensation assembly.

FIG. 20 shows the rear side acoustic structure 510 to optionally include one or more compression chambers 518, impedance boundaries 520, waveguides 522, metamaterial resonator arrays 524, interior cup air volumes 526, and a cup structure 528. The cup structure 528 may be sealed or vented. If vented, the interior of the cup structure 528 is vented to the exterior environment using a cup vent opening 530.

The rear impedance boundary 518 can be formed of a suitable poroacoustic material (such as a porous-matrix layer described above) including, but not limited to, one or more layers of woven fabric or alloy mesh, perforated materials, foams, felts, paper etc. The impedance boundary 518 may be sandwiched between the transducer 502 and other elements of the structure 510, or may be disposed at other locations within the structure 510.

The use of an impedance boundary 520 is optional and may not be present in all configurations. When used, the impedance boundary may be provided with a relatively high Rayl value, such as on the order of about 100 or more, in order to obtain a desired driver response. Other Rayl values can be used, including relatively low Rayl values such as on the order of about 50 or less, depending on the configuration of the system.

When used, the impedance boundary 520 spans at least a portion of the areal extent of the driver 502 to attenuate a corresponding portion of the rear directed sound waves in the vicinity of the impedance boundary. This is depicted by sound wave portion 516A in FIG. 20. A relatively small compression chamber 518 is formed in the volume sealed off by the impedance boundary 520 and the driver 502. The compression chamber 518 in conjunction with the impedance boundary 520 suppresses the localized driver energy as it passes into remaining portions of the structure 510 or directly into the surrounding environment. For reference, this is referred to as a first transmission path ("first path") for the rear directed sound energy.

The waveguide 522 provides a second transmission path for a remaining portion of the rear directed sound energy from the driver 502. This "second path" energy is represented by portion 516B in FIG. 20. In directly coupled arrangements where the resonator array 524 is directly coupled to the driver 502, the waveguide 522 transfers the second path energy into the resonator array 524. Indirect coupling arrangements for the resonator array 524 are also contemplated, and examples of both are discussed below.

Each metamaterial resonator array 520 is formed of a plurality of quarter-wave or Helmholz resonators. As with the front side inserts (e.g., insert 170 in FIGS. 5A-5F, etc.), the resonators can be deployed at any desired angle and can utilize any desired shape, including straight, curved, folded, etc. Different lengths and cross-sections can be provided to obtain the desired suppression and cancellation effects targeting specific frequencies with varying Q factors. The various construction techniques described above for the resonators in the front side insert designs can be readily adapted for the resonators in the rear side structure 510. While not limiting, in some embodiments the resonators in the rear side structure may be arranged to be nominally orthogonal to the resonators in the front side insert.

Various alternative embodiments for the rear side structure 510 will now be presented in turn. Other arrangements can be utilized, including arrangements that combine aspects of two or more of these embodiments, embodiments that include additional features disclosed herein or that are otherwise known in the art, embodiments that locate position elements in different locations, embodiments with different numbers and configurations of elements, and so on.

Figure 21A:
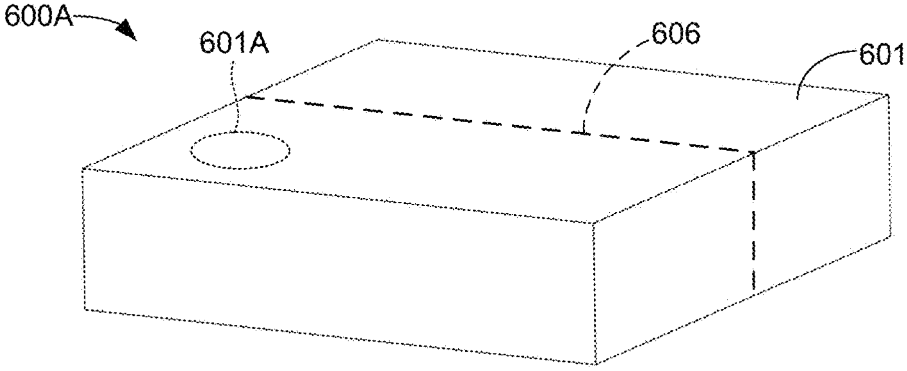
FIGS. 21A-21G respectively illustrate aspects of another rear side acoustic structure having a closed, directly coupled configuration in accordance with some embodiments.
Figure 21B:
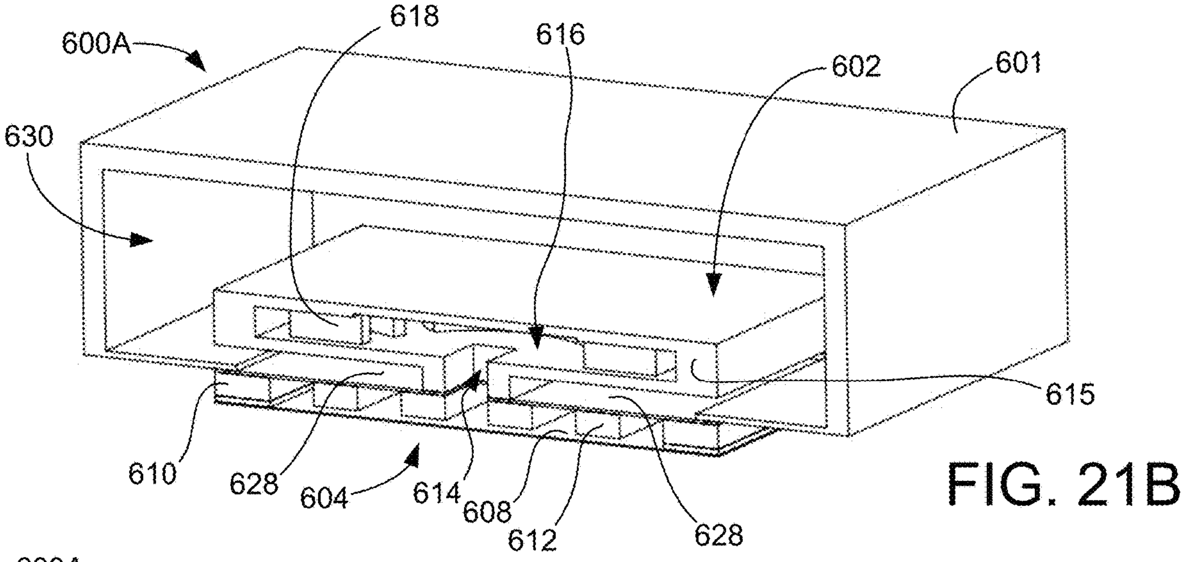
Figure 21C:
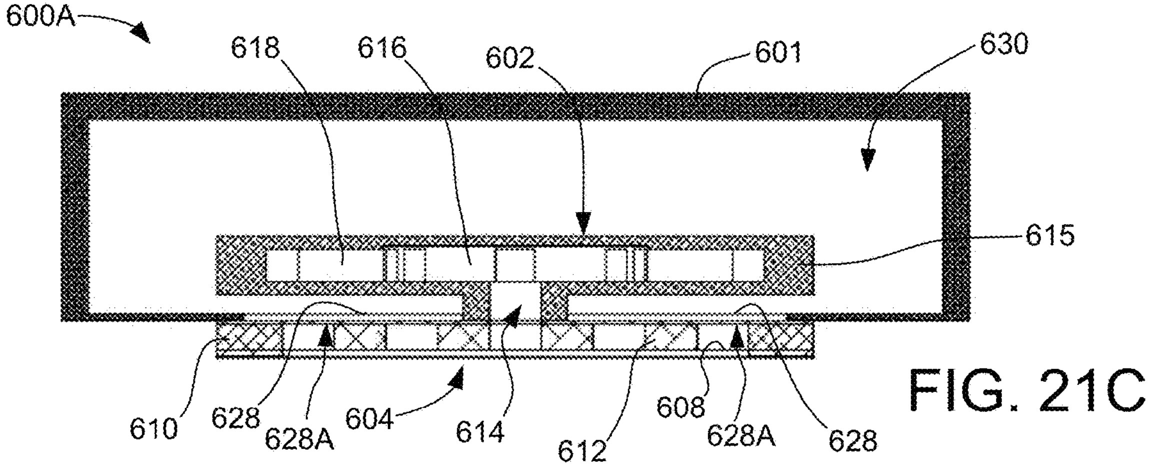
Figure 21D:
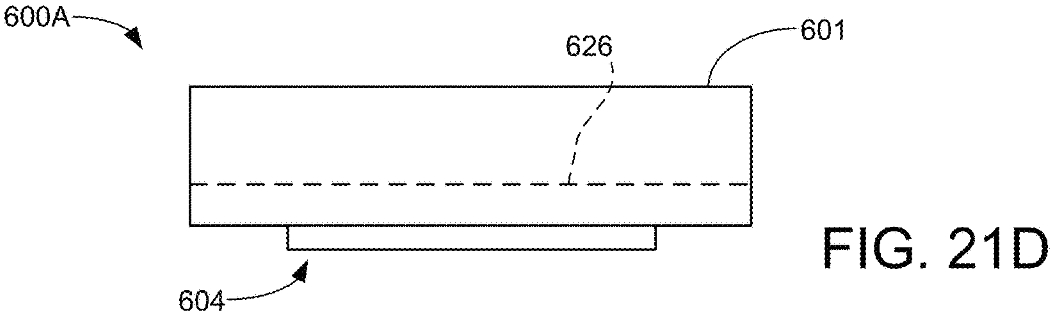
Figure 21E:
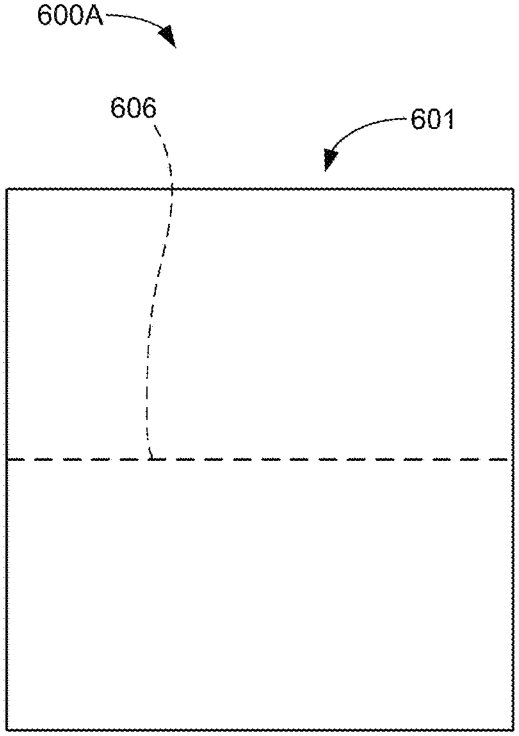
Figure 21F:
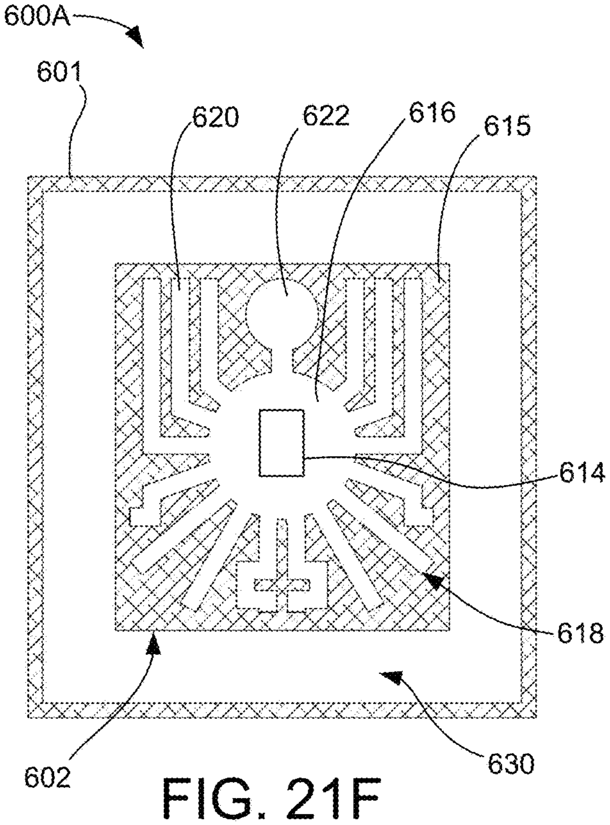
Figure 21G:
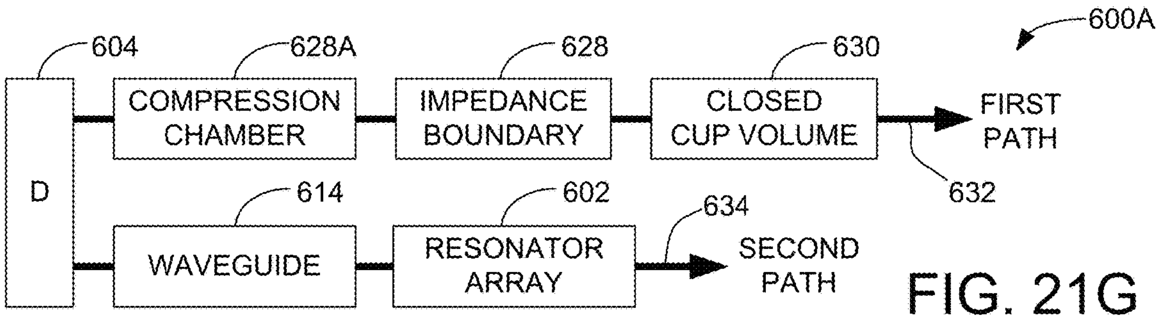
Figure 22A:
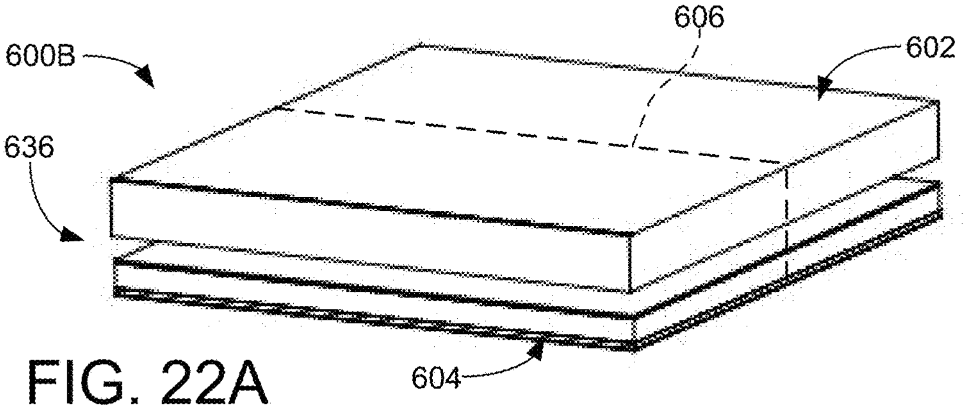
FIGS. 22A-22G respectively illustrate aspects of another rear side acoustic structure having an open, directly coupled configuration in accordance with further embodiments.
Figure 22B:
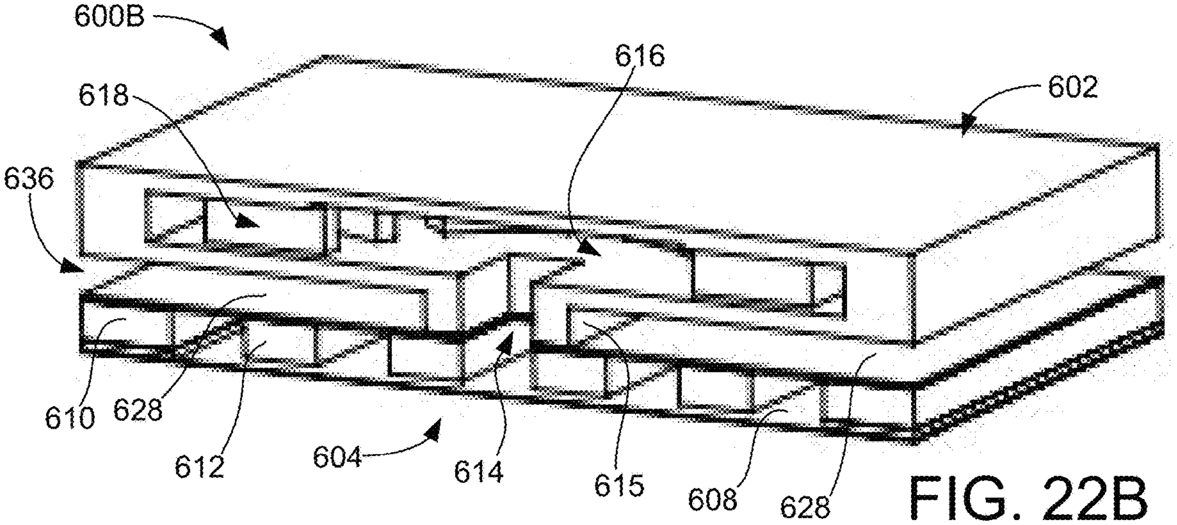
Figure 22C:
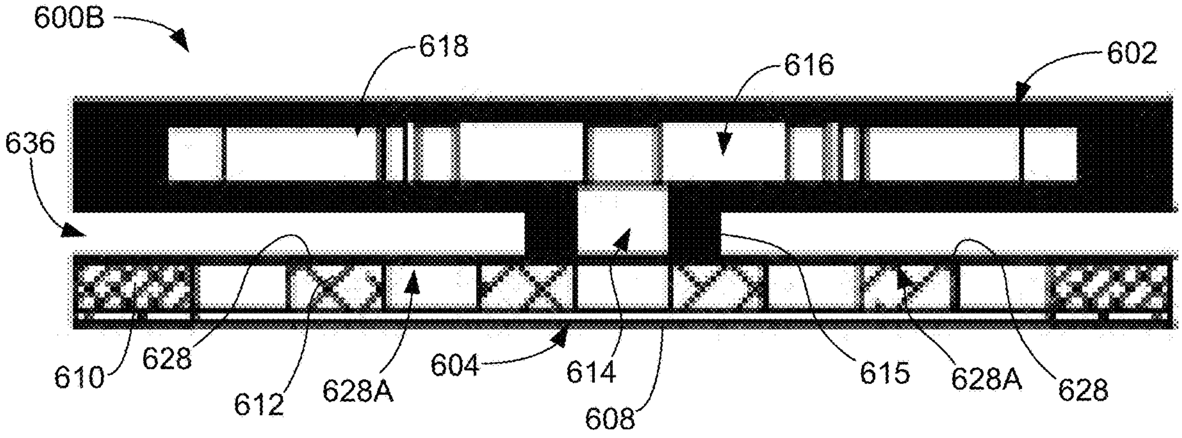
Figure 22D:
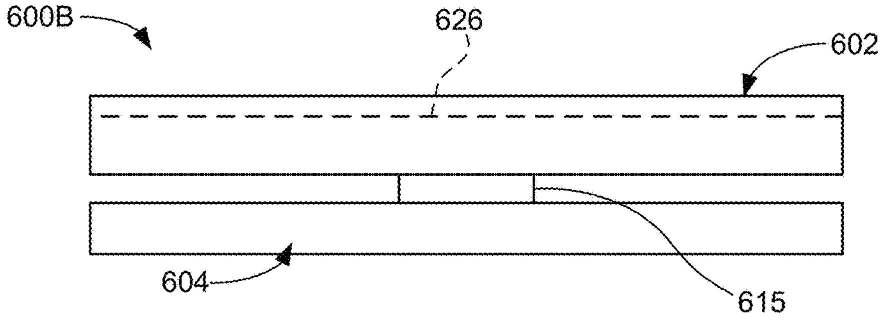
Figure 22E:
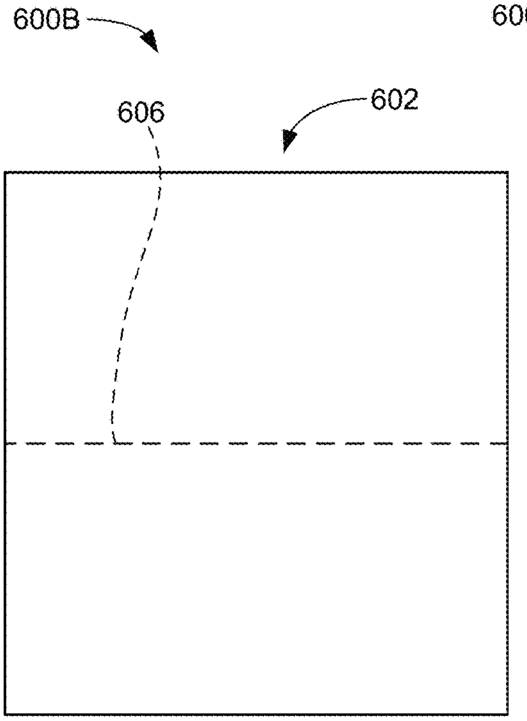
Figure 22F:
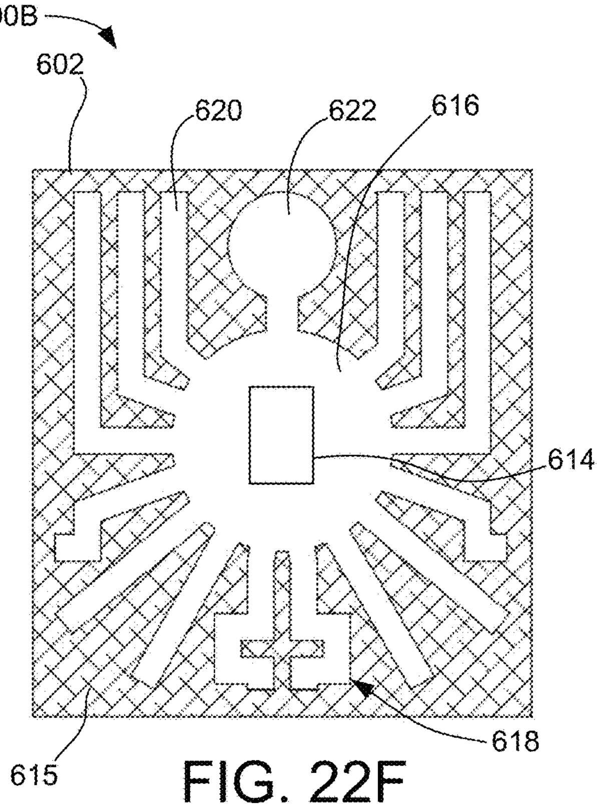
Figure 22G:
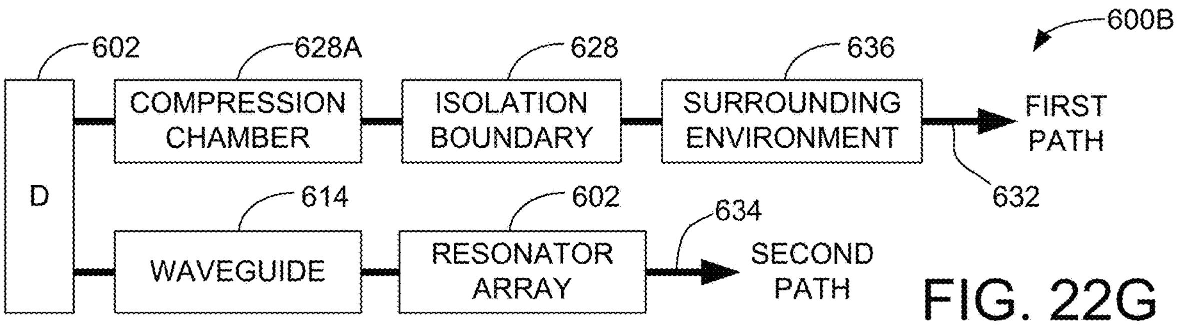
Figure 23A:
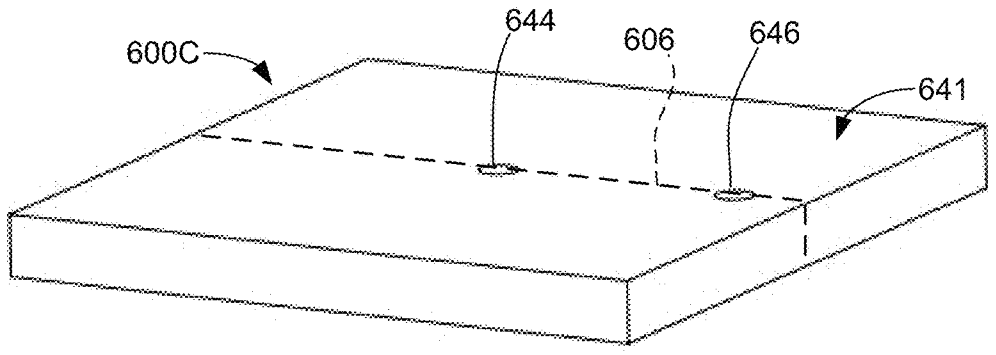
FIGS. 23A-23G respectively illustrate aspects of another rear side acoustic structure having a closed, indirectly coupled configuration in accordance with further embodiments.
Figure 23B:
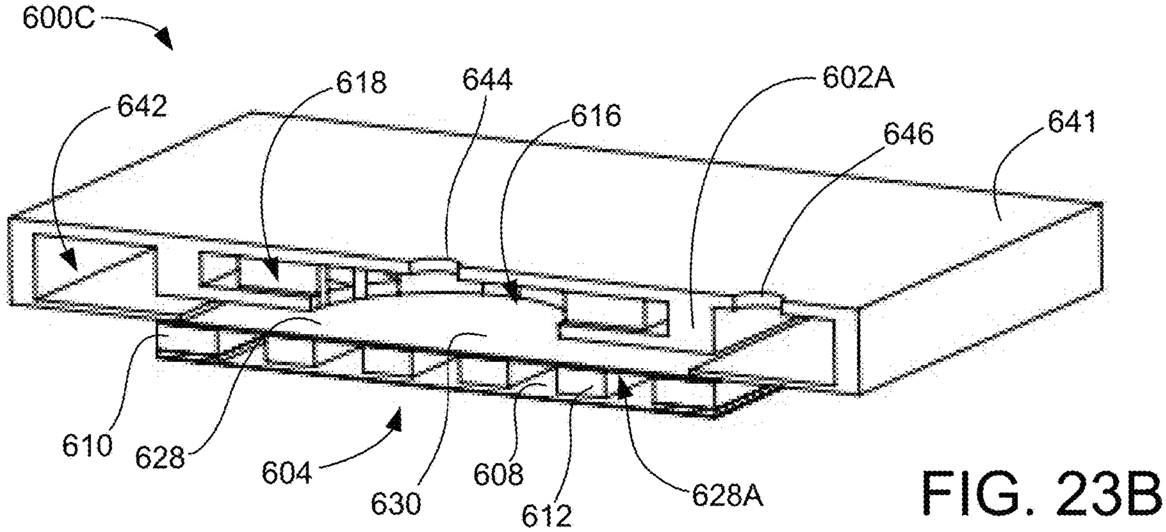
Figure 23C:
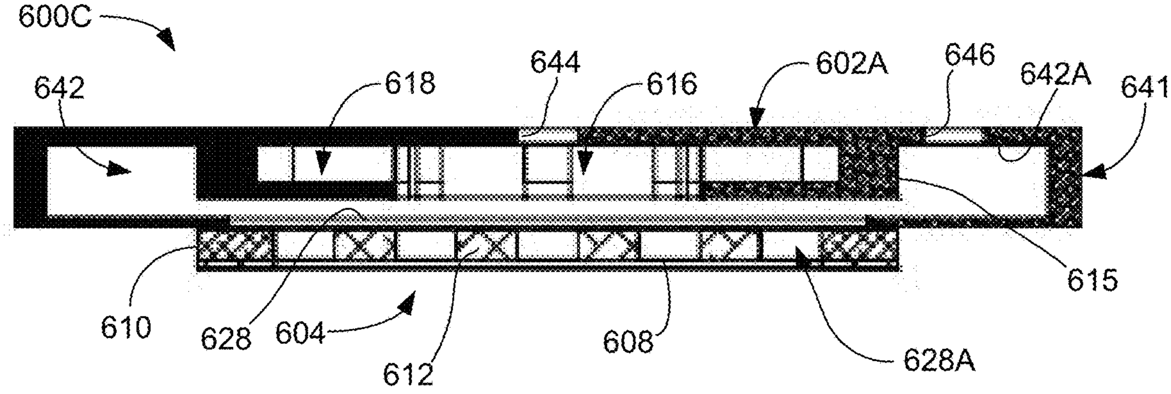
Figure 23D:
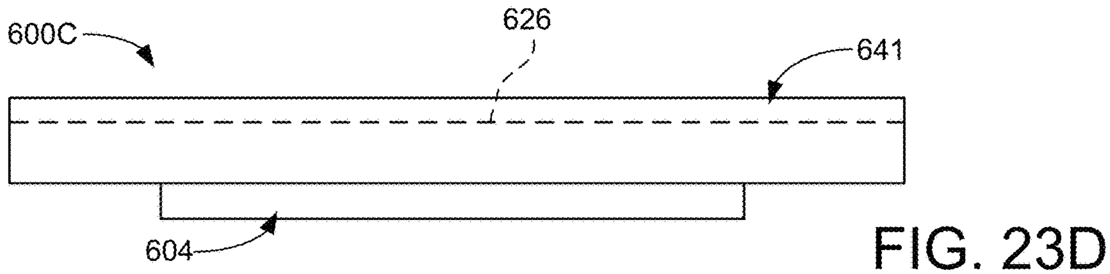
Figure 23E:
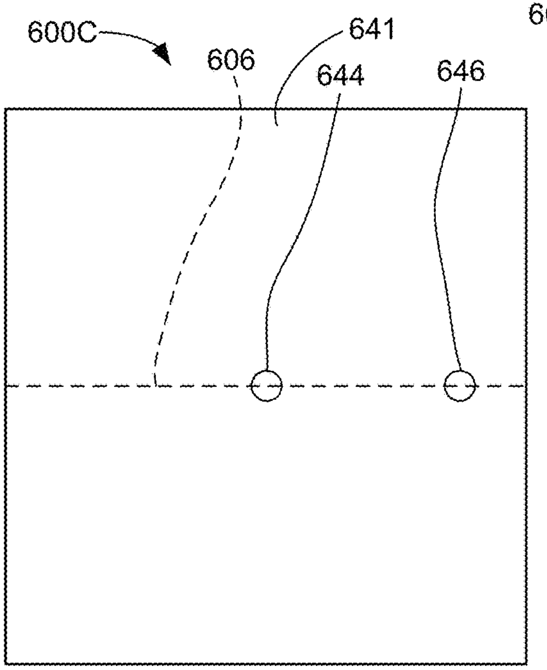
Figure 23F:
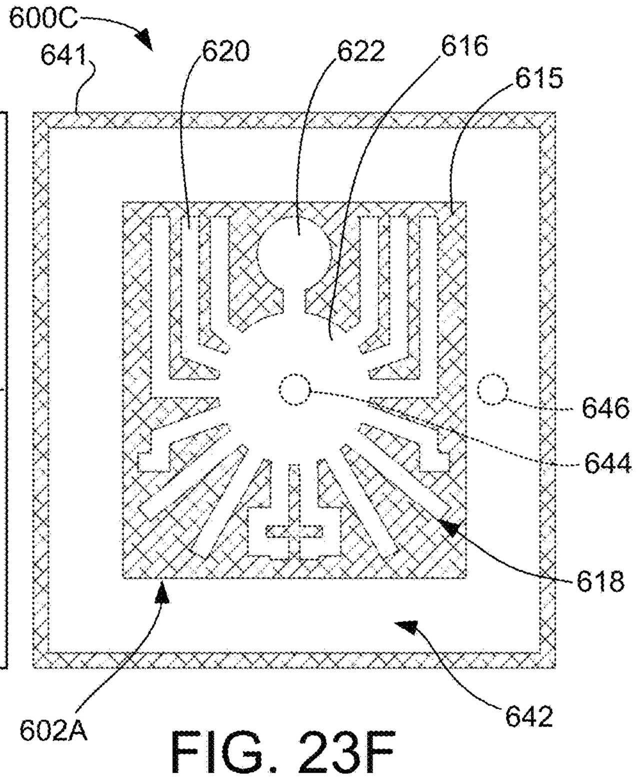
Figure 23G:
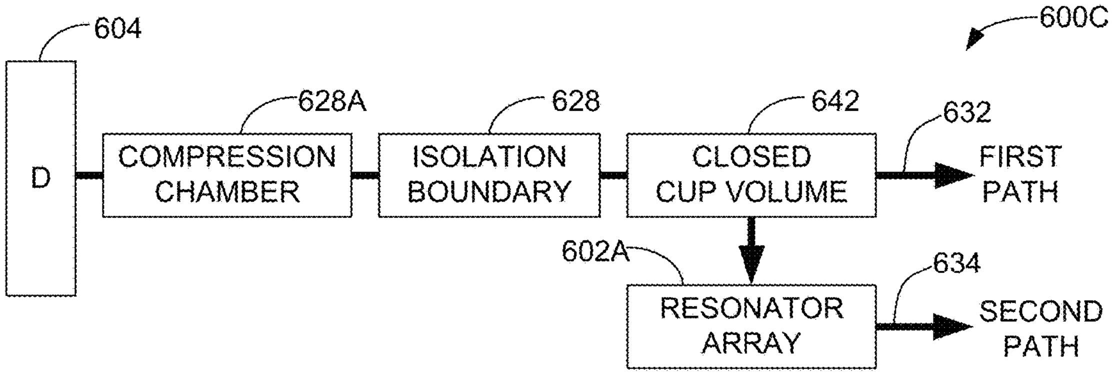

FIGS. 21A through 21G depict a first embodiment for a rear side structure 600A that generally corresponds to the structure 510 in FIG. 20. The structure 600A employs a closed, directly coupled configuration. For reference, FIG. 21A shows an isometric view of the structure 600A; FIGS. 21B and 21C show isometric and end cross-sectional views of the structure along a section line shown in FIG. 21A; FIG. 21D is a side elevational view; FIG. 21E is a top plan view; FIG. 21F is a top plan, cross-sectional view of an interior resonator array of the structure along a section line shown in FIG. 21D; and FIG. 21G is an operational block representation of the structure.

The structure 600A has a cup structure 601 with a substantially rectilinear form factor, but such is not necessarily required. Rather, the structure can take substantially any planar or curvilinearly extending three dimensional (3D) shape, including round, cylindrical, contoured, hemispherical, irregular, etc. The cup structure 601 has an optional vent 601A. As best viewed in FIGS. 21B-21C, the structure 600A has a resonator array 602 mechanically affixed to an underlying driver (transducer) assembly 604. The cut-away views of the structure 600 in FIGS. 21B-21C are taken along section line 606 in FIG. 21A.

The driver 604 includes a vibratory membrane 608 supported by a peripherally arranged rigid frame 610. Stationary magnets 612 interact with electrical traces (not separately shown) formed on the moveable membrane 608 in a voice coil arrangement. Substantially any type of driver can be used, including non-planar drivers, electrostatic drivers, piezoelectric drivers, etc.

A coupling channel (waveguide) 614 extends upwardly from any location behind the driver 604 into the resonator array 602. The resonator array 602 includes a housing 615 into which a receiving chamber 616 is formed. Coupled to the central receiving chamber 616 are the waveguide 614 and a resonator structure 618. The resonator structure 618 has a plurality of individual, differently sized and shaped resonators 620, 622 that radiate from the central chamber 616. While a plurality of resonators 620, 622 are shown, other embodiments can use a single resonator. The resonators 620, 622 are also sometimes referred to as resonator channels. Use of a rectilinearly shaped waveguide 614 is advantageous but is not required, as other shapes can be used including cylindrical, flared, etc.

FIG. 21F shows interior portions of the resonator array 602 as taken along section line 626 in FIG. 21D. The resonators 620, 622 can maintain a nominally constant cross-sectional opening area as represented by the quarter-wave resonator 620, or can vary over the lengths of the channels, including by opening up to a larger cavity such as depicted by the Helmholtz resonator 622. While the resonator channels are arranged along a single plane, the channels can extend in any other suitable direction(s), including in a stacked arrangement in a 3D array.

Impedance boundaries are shown at 628 in FIGS. 21B-21C. The boundaries 628 can take any suitable configuration to provide a desired impedance layer to some or all of the remaining exposed areal extent of the driver 604 surrounding the waveguide 614.

As discussed above, each impedance boundary 628 comprises a thin layer of poroacoustic damping material. A thin compression chamber 628A may be formed between each impedance boundary 628 and the corresponding portions of the driver membrane 608, as best viewed in FIG. 21C. The upwardly facing surfaces of the impedance boundaries 628 are in facing relation to an interior cup volume 630 within the cup structure 601.

The direct connection of the resonator array 602 to the rear side of the driver 604 provides parallel transmission paths for energy transfer and suppression, as shown in FIG. 21G. A first path is denoted at 632, and a second path is denoted at 634.

The first path 632 corresponds to that portion of the rear directed sound energy from the driver (D) 604 that passes through the compression chamber 628A, impedance boundary 628 and into the closed cup volume 630 within the cup structure 601. The second path 634 corresponds to that portion of the rear directed sound energy from the driver 504 that is directed through the waveguide 614 and into the resonator array 602. As such, these first and second paths 632, 634 respectively correspond to the arrows 516A, 516B in FIG. 20. It will be appreciated that these designators may be reversed so that the energy directed into the resonator array can be alternatively referred to as passing along a first path and the bypass energy can be referred to as passing along a second path.

While not necessarily limiting, it is contemplated in at least some embodiments that the effective impedance to the driver 604 along the first path 632 is greater than the effective impedance of the second path 634. This tends to direct more of the rear directed sound energy into the resonator array 602 than that which passes into the interior cup volume. The impedance level of the one or more impedance boundaries can be selected to achieve the desired division of energy between these respective paths. Other system configurations can be made to achieve this effect.

As a result, the impedance boundaries 628 and the waveguide 614 are sometimes collectively referred to as a bypass path structure, since these elements cooperate to direct a first portion of the rear directed sound waves from the driver (transducer) 604 into the resonator array 602 and a remaining second portion of the rear directed sound waves away from and adjacent to the resonator array 602.

The resonator array 602 shapes the frequency response of the driver 604 by suppression and cancellation of specific frequencies and ranges of interest within that portion of the sound waves that pass into the resonator array. The energy directed into the cup volume 630 outside the resonator array 602 is absorbed, which reduces the occurrence of standing waves. Less than all of the rear directed energy passes into the resonator array(s). The remaining energy intentionally bypasses the resonator array(s) to absorb and/or dampen standing and reflected waves behind the driver 604.

A number of design parameters are selected to configure a particular structure such as 600A for a given driver 604. These parameters include, but are not limited to, the placement and size of the resonator array, the number and sizes of the resonators, the shape of the cup, the use and Rayl value of the impedance boundaries, and so on. These parameters can be determined by evaluating the native performance of the driver 604, selecting frequencies of interest that require suppression from the driver, configuring the resonator array 602 to cancel or reduce the sound energy over these selected frequencies, and adjusting the impedance of the impedance boundary 628 as well as remaining portions of the structure 600A as required to direct the appropriate amounts of energy along the respective first and second paths.

An impedance boundary may not be necessary in some cases if sufficient energy can be directed into the resonator array and the required absorption of the first path energy is otherwise provided by other elements of the system (including a front side insert, damping material on a rear side wall, etc.). The structure 600A can be mounted within a larger overall headphone arrangement as desired.

FIGS. 22A through 22G show another rear side acoustic structure 600B. The structure 600B is substantially identical to the structure 600A in FIGS. 21A-21G, except that the structure 600B does not have the cup structure 601. As such, like reference numerals have been used for similar components.

The structure 600B can be characterized as having an open-back directly coupled configuration. The energy directed through the respective impedance boundaries 628 along the first path 632 passes directly into the surrounding environment, as denoted at 636 in FIGS. 22B, 22C and 22G. As before, a selected amount of the energy is directed into the resonator array 602 by the waveguide 614 along the second path 634.

FIGS. 23A through 23G show yet another alternative rear side acoustic structure 600C. The structure 600C is somewhat similar to the structure 600A in FIGS. 21A-21F in that the structure 600C employs an outer cup structure 641 with interior cup volume 642 and optional vent openings 644, 646.

The structure 600C has a closed, indirectly coupled arrangement. Instead of using an interior waveguide, an interior resonator array 602A is mounted to any internal surface 642A of the cup structure 641, and the resonator array is indirectly coupled to the driver 604 via the intervening air cup volume 642.

A single impedance boundary 628 and corresponding compression chamber 628A spans substantially an entirety of the areal extent of the driver 604. In this way, essentially all of the rear directed sound energy passes through these elements into the interior cup volume 642, and only a portion of this energy in turn passes into the resonator array 602 (see FIG. 23G). In this arrangement, the bypass path structure is made up of the impedance boundary 628 since the waveguide 614 is omitted. Nonetheless, as before, a first portion of the rear directed sound energy will enter the resonator array 602 and a remaining second portion of the rear directed sound energy will bypass the resonator array.

This indirect configuration provides relatively higher amounts of damping, reflection and standing wave suppression, and relatively lower amounts of tuned frequency range suppression. It is contemplated that this arrangement is particularly suitable for some driver configurations to shape the frequency response of the system. As desired, interior features such as baffles, layers of damping material, etc. (not separately shown) can be further incorporated into the bypass path structure to adjust the relative amounts of energy that respectively enter and bypass the resonator array 602.

The optional vents 644, 646 can be used to adjust the relative flow of the energy through the structure 600C. The vent 644 is coupled to the resonator array 602 to adjust the input impedance of the resonator array and provide other benefits. The vent 646 adjusts the impedance and resonance characteristics of the overall interior space.

Regardless, as before the metamaterial resonator array 602 will absorb energies to the rear of the driver, in effect making it appear to the driver that energy is radiating into a non-reflective/non-resonant space and allowing elimination of standing waves characteristic to enclosed pressure chambers behind a transducer. In this way, the cup may "acoustically disappear," thereby affording the potential of shaping the frequency response by absorbing only selective frequencies that otherwise will shape the output on the front side of the driver.

It should be noted that, generally, the higher the Rayl value of an impedance boundary to the rear of the driver, the ability of the system to dampen is generally higher, but the ability of the system to provide selected adjustments to frequency response is generally lower. For an indirect coupling arrangement such as with the structure 600C, the impedance boundary may tend to have a lower Rayl value, such as in a range of from about 0-100. Other ranges can be used.

FIGS. 24A through 24H show still another alternative rear side acoustic structure 600D. The structure 600D provides both a directly coupled resonator array 602 and an indirectly coupled resonator array 602A. Both resonator arrays 602, 602A are housed within a cup structure 651 with interior cup volume 652.

Figure 24A:
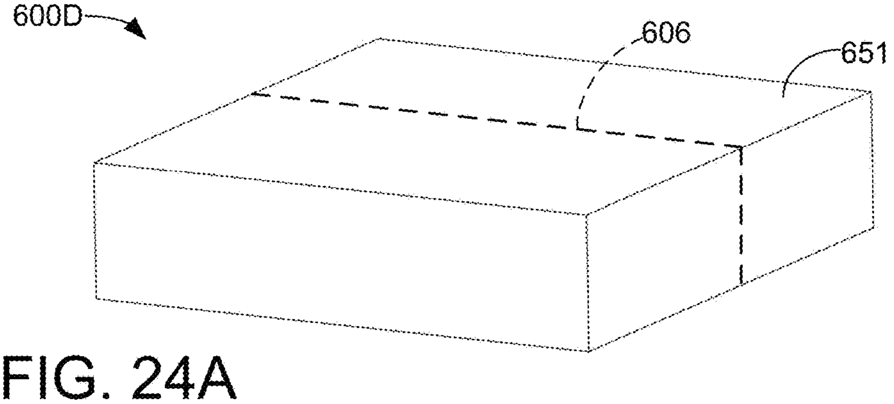
FIGS. 24A-24H respectively illustrate aspects of another rear side acoustic structure having a closed and both directly and indirectly coupled configuration in accordance with further embodiments.
Figure 24B:
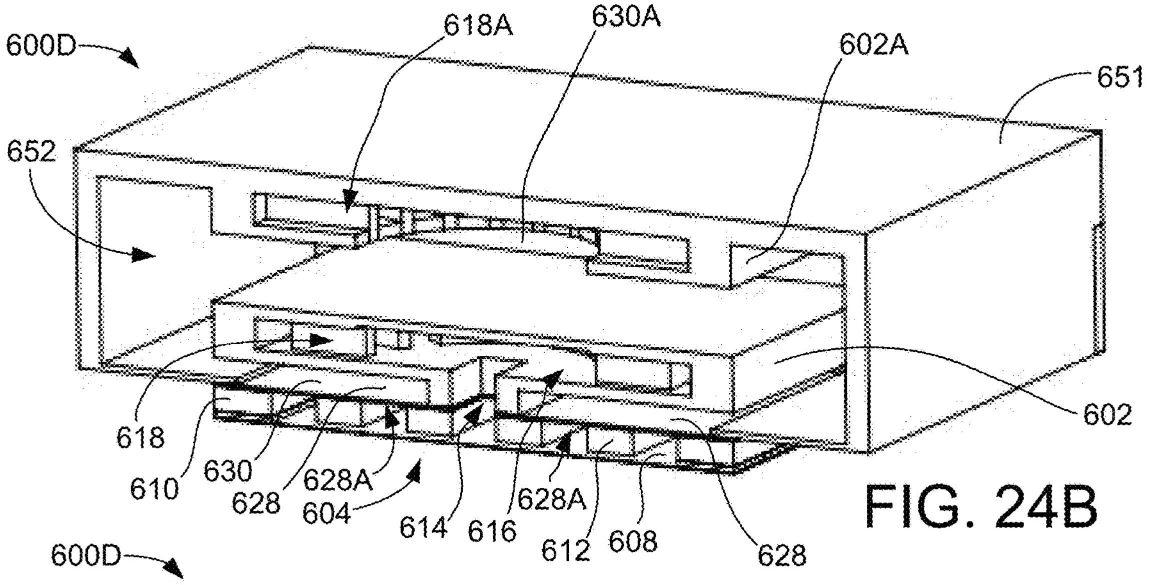
Figure 24C:
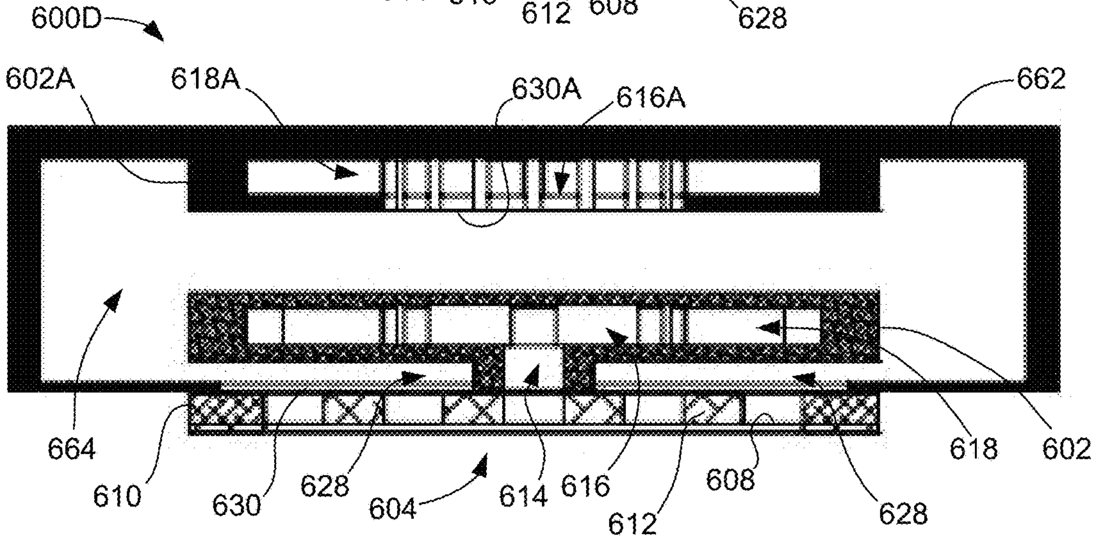
Figure 24D:
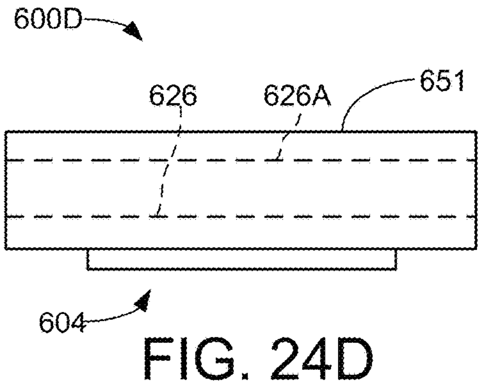
Figure 24E:
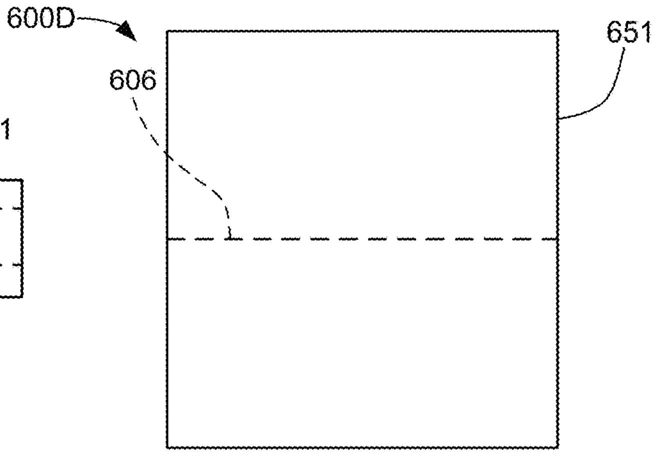
Figure 24F:
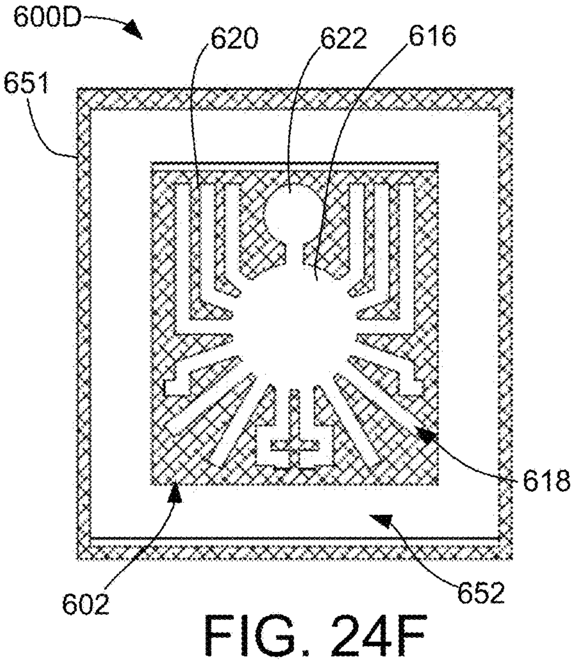
Figure 24G:
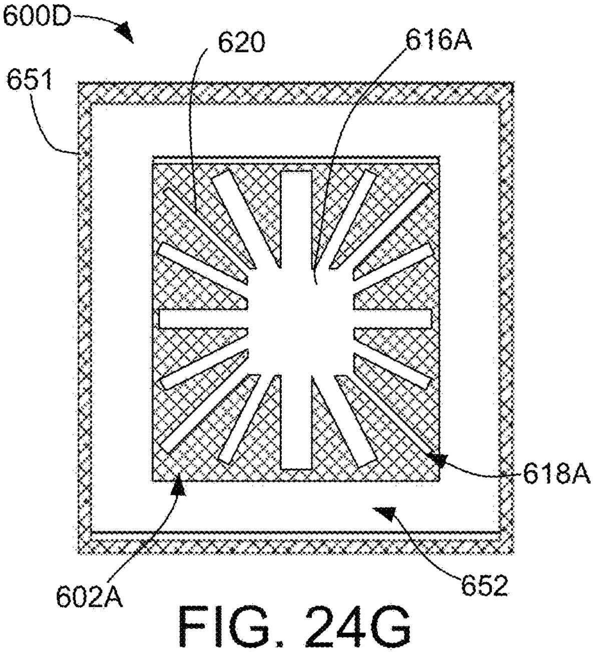
Figure 24H:
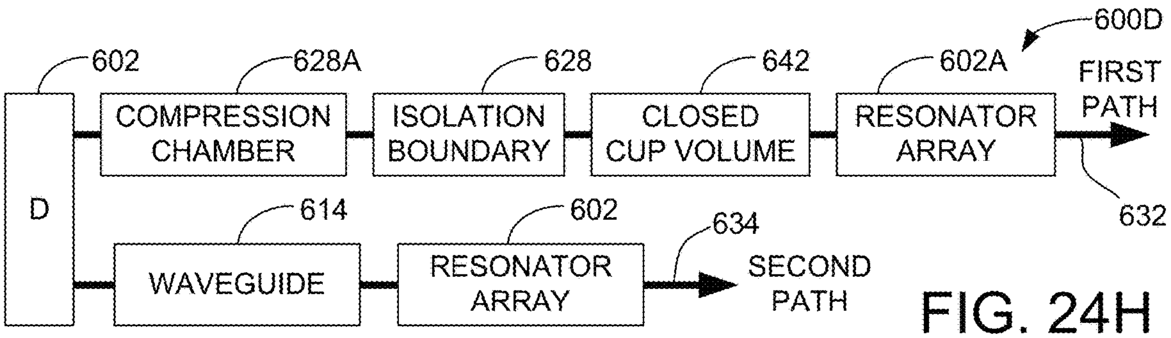

As desired, the upper resonator array 602A can be nominally identical to the lower resonator array 602, or these respective structures may be different as shown in FIGS. 24F and 24G. For reference, these respective figures are taken along section lines 626 and 626A in FIG. 24D. The upper resonator array 602A is shown to have resonant structure 618A with open chamber 616A, each taking a nominally rectilinear shape. Other configurations can be used as desired.

The use of separate resonator arrays 602, 602A allows significant control of resonances within the cup volume. The cup 651 in this example is fully closed, but venting can be applied to the cup 651, the lower resonator 602 and/or upper resonator 602A as required.

Figure 25A:
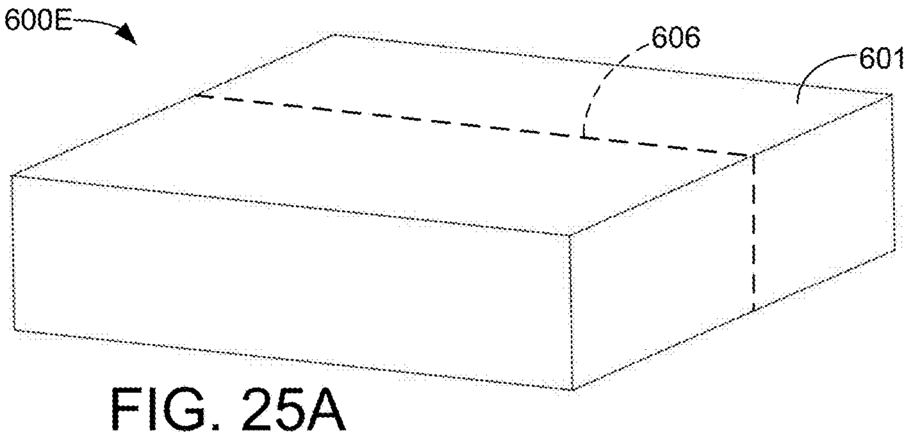
FIGS. 25A-25G respectively illustrate aspects of yet another rear side acoustic structure having a closed and directly coupled individual resonators configuration in accordance with further embodiments.
Figure 25B:
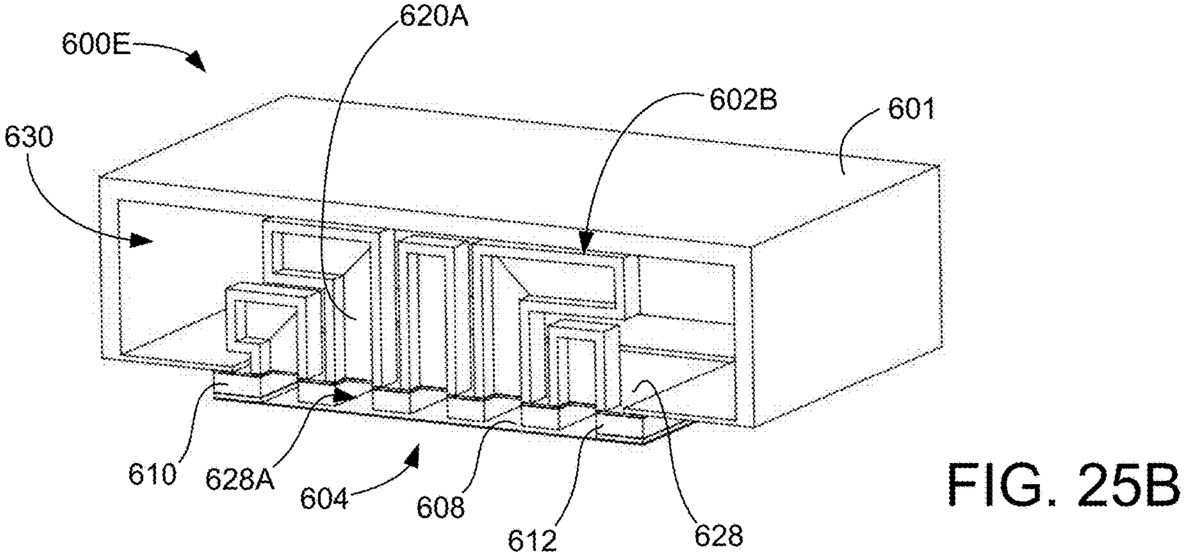
Figure 25C:
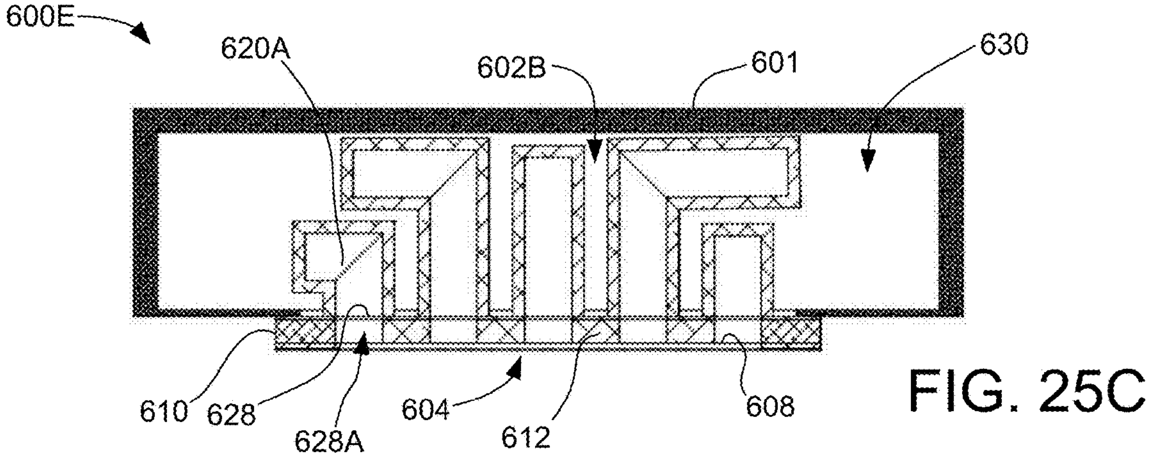
Figure 25D:
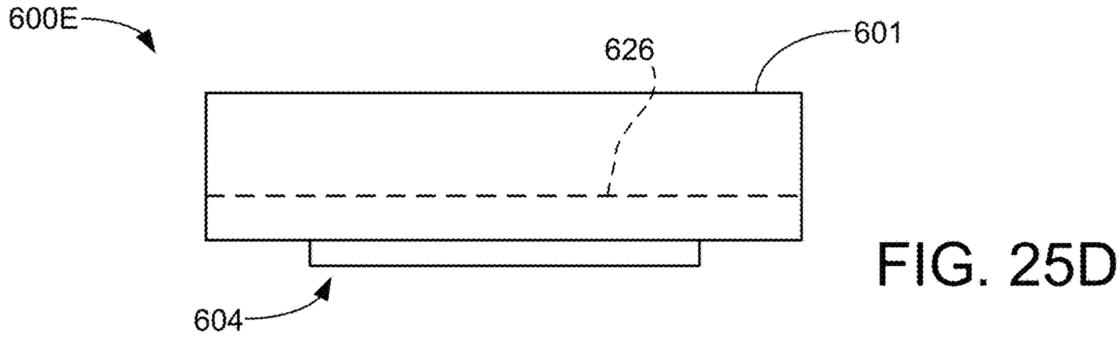
Figure 25E:
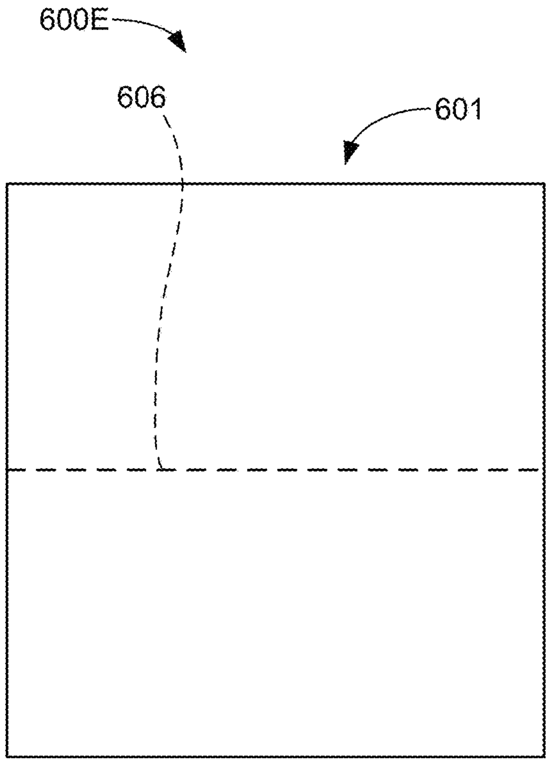
Figure 25F:
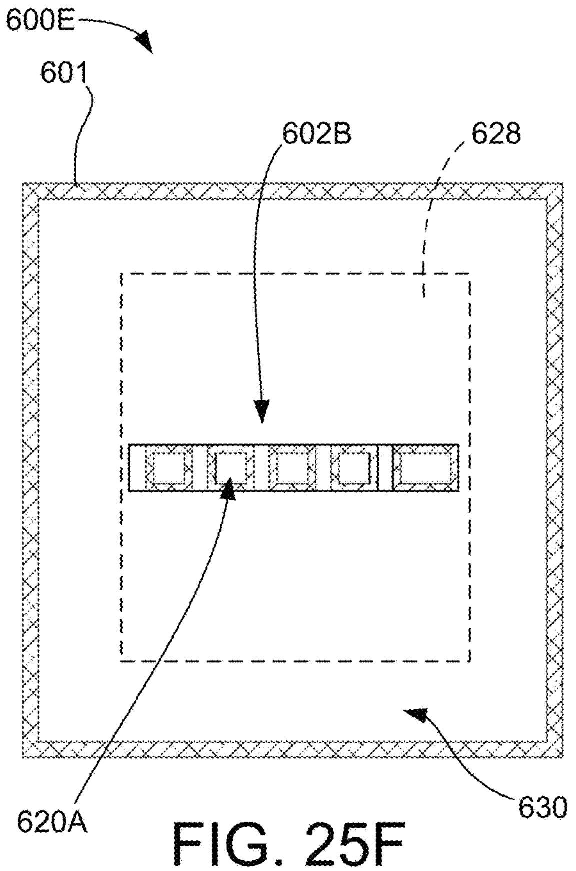

FIGS. 25A through 25G show yet another alternative configuration for a rear side acoustic structure 600E in accordance with further embodiments. In this case, a resonator array 602B is formed from a plurality of individual resonators 620A that are each directly coupled to the driver 604. Each resonator 620A is provided with a different length to provide a different frequency suppression response. The resonators 620A can also have different cross-sectional areas, as represented in FIG. 25F.

Figure 25G:
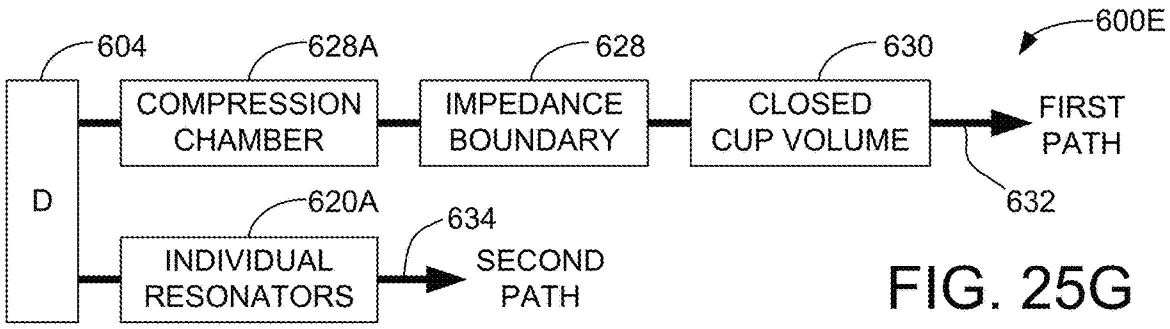

As before, the arrangement provides two parallel paths 632, 634 for the rear directed energy from the driver 604, as shown in FIG. 25G. While only five (5) resonators 620A are shown in a 1×5 two dimensional (2D) arrangement along the areal extent of the driver 604, substantially any number of resonators can be arranged in an M×N 2D pattern across the areal extent of the driver where M and N are respective plural numbers.

The structure 600E thus takes a closed, directly coupled individual resonators configuration. An open arrangement without the cup 601 and enclosed interior cup volume 630 can also be used. In FIG. 25B it should be noted that an optional impedance node can be placed between the transducer's compression chamber and the resonators, but this impedance boundary should have a Rayl value less than or equal to the impedance boundary 628.

Figure 26:
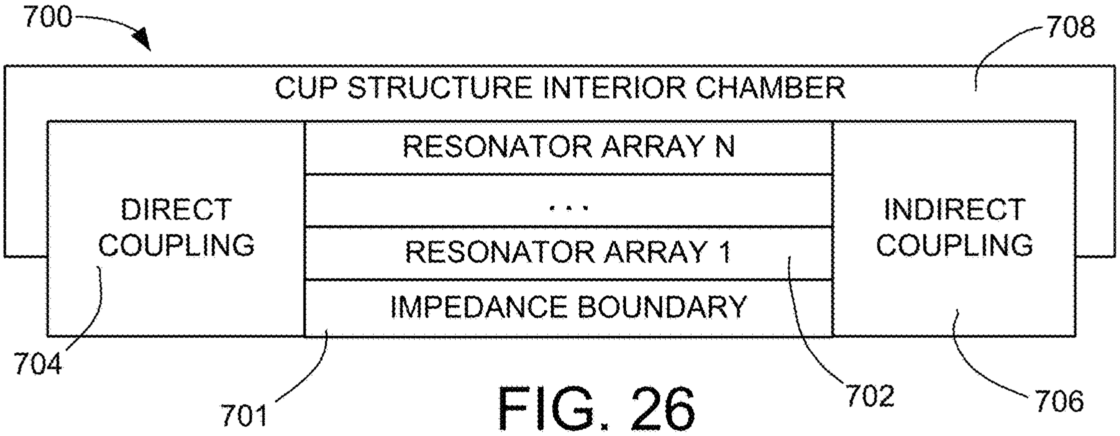
FIG. 26 provides another functional block representation of a rear side acoustic compensation structure having an array of resonator arrays in a three dimensional (3D) arrangement in accordance with further embodiments.

FIG. 26 provides a functional block representation of another rear side compensation structure 700 that can be configured in accordance with the foregoing discussion. The structure 700 includes various elements that may be arranged as required to provide a desired compensation response, including an impedance boundary 701 and an arrangement of stacked resonator arrays 702 denoted as arrays 1 through N. Additional elements can be provided to provide direct coupling, as shown at 704, and indirect coupling, as shown at 706. An interior cup volume 708 can additionally be supplied via a cup structure.

The respective resonator arrays 702 may be coupled one to another using the same or different transmission paths. In some embodiments, the resonator arrays form a 3D stacked arrangement of resonator channels to provide compensation to the portion of the sound waves supplied by the driver.

While each of the respective resonator arrays discussed above have provided a centrally located receiving chamber (e.g., 616) as the entry point for the received energy, other arrangements can be used including multiple entry points, offset entry points, etc.

Figure 27:
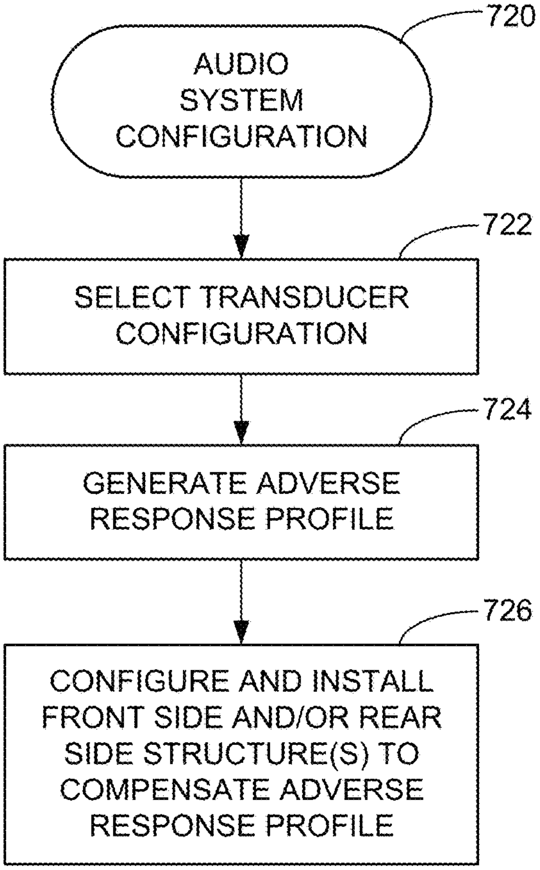
FIG. 27 shows a flow chart for an audio system configuration routine illustrative of steps that can be carried out in accordance with various embodiments to configure a rear side acoustic structure for use in a selected environment.

FIG. 27 provides a flow chart for an audio system configuration routine 720, illustrative of steps that may be carried out in accordance with various embodiments to configure an audio system. It will be understood that a particular design process will begin with a number of factors and specifications that are to be met by a final design, including performance, size, cost, etc. Such considerations are included within this process flow but are not separately denoted for purposes of clarity.

At some point in the design process, a particular driver design will be selected for use in the final design, as shown by step 722. Through empirical and/or subjective analyses, an adverse response profile will be generated at step 724, which identifies characteristics in the output performance from the transducer that require compensation. This can include, as described above, the generation of standing waves, reflections, undesired frequency response features, and so on.

As shown by step 726, compensation of the adverse response profile is obtained by selecting and configuring one or more compensation structures for incorporation into the audio system. The compensation structures can be a front side acoustic structure (insert), a rear side acoustic structure, or both. In some cases, a single device may be sufficient to provide the desired compensation. In other cases, it is contemplated that one of these types of devices, such as the insert, may be initially utilized to provide compensation for a first range of issues, and then the other one of these types of devices, such as the rear side structure, may thereafter be configured to provide compensation for a second remaining set of issues (including potentially issues generated by the first device).

It is therefore contemplated that the various embodiments presented herein provide a number of alternative compensation techniques that can be used, alone or in combination, to provide desired compensation to the audio performance of a transducer. It is contemplated that the various embodiments can be utilized in a variety of different types of audio systems, including headphones of various types that can be worn by an individual user.

Figure 28:
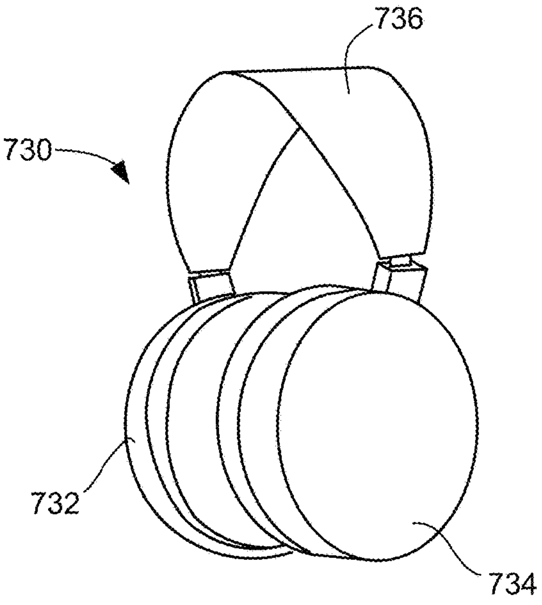
FIG. 28 shows a schematic representation of a set of external headphones to provide an illustrative environment in which various embodiments of the present disclosure can be practiced.

FIG. 28 provides a schematic representation of a pair of external headphones 730 of an otherwise conventional style configured to be worn externally on the head of the user. A pair of opposing ear cups 732 (ear pieces) include padded interior surfaces 734 that comfortably contact and/or surround the user's ear, as well as an adjustable headband 736 that interconnects the ear cups 732. Both the rear side and front side structures disclosed herein are readily adaptable for incorporation into headphones such as 730. While the headphones 730 are depicted as wireless headphones, wired connections can be provided as well to direct the audio signals to the respective drivers. Other configurations of headphones can be utilized.

It will now be appreciated that various embodiments of the present disclosure provide a number of advantages over the existing art. Some embodiments provide a rear side acoustic structure that is coupled to a rear side of a transducer configured to emit acoustic information to the eardrum of a user. The rear side acoustic structure includes one or more resonator arrays formed of a suitable metamaterial construction to provide desired compensation, absorption and suppression of undesired components within the emitted sound waves.

The rear side acoustic structure provides an open field type response so that the primary source waves from the transducer are essentially fully absorbed and provide no reflectance for targeted frequencies, and any secondary source waves reflected back from the user's ear drum are also absorbed at those frequencies. A first path of the rear directed sound waves bypasses the resonator array(s) to provide suppression of standing waves, and a second path of the rear directed sound waves enter the resonator array(s) for selected tuned frequency suppression. The rear side acoustic structure can be used in combination with, or in lieu of, the front side acoustic inserts also described herein.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus, comprising:

a transducer configured to concurrently generate forward directed and rear directed sound waves responsive to an input electrical driver signal, the forward directed sound waves emitted from a front side of the transducer for passage along an ear cavity of a user, the rear directed sound waves emitted from a rear side of the transducer for passage in a direction away from the ear cavity of the user; and a rear side acoustic compensation structure coupled to the rear side of the transducer, comprising:

a resonator array configured to receive a first portion of the rear directed sound waves along a first transmission path, the resonator array comprising at least one resonator channel configured to suppress at least one selected frequency of interest in the first portion of the rear directed sound waves received by the resonator array; and a bypass path structure adjacent the resonator array configured to direct the first portion of the rear directed sound waves into the resonator array and to direct a remaining second portion of the rear directed sound waves along a second transmission path away from the resonator array to dampen an overall energy level of the remaining second portion, the first portion constituting less than all of the rear directed sound waves.

2. The apparatus of claim 1, wherein the bypass path structure comprises an impedance boundary affixed to the rear side of the transducer adjacent the resonant array.

3. The apparatus of claim 2, wherein the impedance boundary comprises a layer of poroacoustic material with a Rayl value of from 0-100.

4. The apparatus of claim 1, wherein the resonator array is a metamaterial structure comprising a plurality of resonator channels characterized as closed quarter-wavelength or Helmholz resonators of different lengths to compensate different selected frequencies of interest within the first portion of the rear directed sound waves.

5. The apparatus of claim 1, wherein the resonator array is directly coupled to the rear side of the transducer via a waveguide that extends from the transducer to an entrance chamber of the resonator array, and wherein the bypass path structure comprises an impedance boundary comprising a poroacoustic layer of material that surrounds the waveguide and covers a remaining areal extent of the transducer not covered by the waveguide.

6. The apparatus of claim 1, wherein the resonator array is indirectly coupled to the rear side of the transducer via an intervening air cup volume that extends between the resonator array and the transducer, and the bypass path structure comprises an impedance boundary comprising a poroacoustic layer of material that covers an entirety of an areal extent of the transducer.

7. The apparatus of claim 6, further comprising a cup structure coupled to the rear side of the transducer, the cup structure having an interior sidewall that defines an interior chamber into which the resonator array is disposed, the resonator array contactingly secured to the interior sidewall at a selected separation distance from the transducer so that the first portion passes into the resonator array and the second portion bypasses the resonator array within the air cup volume.

8. The apparatus of claim 1, wherein the resonator array is a first resonator array that is directly coupled to the transducer, and wherein the apparatus further comprises a second resonator array that is indirectly coupled to the transducer and separated from the first resonator array within an air cup volume.

9. The apparatus of claim 1, wherein the resonator array and the bypass path structure are each housed within a cup structure sealingly coupled to the transducer.

10. The apparatus of claim 9, wherein at least one vent aperture provides a vent opening communicating between an air cup volume within the cup structure and an exterior environment outside the cup structure.

11. The apparatus of claim 1, further comprising a front side acoustic compensation insert coupled to the front side of the transducer, the insert comprising a plurality of channels configured to dampen a frequency component of the forward directed sound waves from the front side of the transducer.

12. The apparatus of claim 1, characterized as a set of headphones configured to be worn on a head of a user, the set of headphones having respective left side and right side ear pieces, wherein the transducer and the rear side acoustic compensation structure are characterized as a first transducer and a first rear side acoustic compensation structure located in the left side ear piece, and wherein the apparatus further comprises a second transducer nominally identical to the first transducer and a second rear side acoustic compensation structure nominally identical to the first rear side acoustic compensation structure located in the right side ear piece.

13. The apparatus of claim 1, wherein the resonator array is a first resonator array, and the rear side acoustic compensation structure further comprises a plural number N resonator arrays in a three-dimensional (3D) stacked arrangement, each of the N resonator arrays having an associated plurality of resonator channels configured to compensate the first portion of the rear directed sound waves from the transducer.

14. The apparatus of claim 1, wherein the bypass path structure comprises an impedance boundary comprising a layer of material that spans an areal extent of the transducer to form a compression chamber between the impedance boundary and a moveable membrane of the transducer.

15. The apparatus of claim 1, wherein the transducer is characterized as a voice coil based magnetic transducer comprising an arrangement of at least one conductor, at least one magnet, and a moveable membrane that vibrates responsive to a frequency content of the electrical input driver signal, the bypass path structure comprising an impedance boundary that spans at least a portion of an overall areal extent of the membrane.

16. The apparatus of claim 1, wherein the bypass path structure is provided with an impedance that is greater than an impedance of the resonant array to facilitate passage of a greater amount of the rear directed sound waves into the resonant array and a lesser amount of the rear directed sound waves away from the resonant array.

17. A method comprising:

supplying an input electrical driver signal to a transducer to concurrently generate forward directed and rear directed sound waves, wherein the forward directed sound waves are directed from a front side of the transducer along an ear cavity of a user for audio perception thereby and the rear directed sound waves are directed from an opposing rear side of the transducer in a direction away from the ear cavity of the user; and suppressing the rear directed sound waves by using a bypass path structure to direct a first portion of the rear directed sound waves into a resonance array along a first transmission path and to direct a remaining second portion of the rear directed sound waves away from the resonance array along a second transmission path, the resonance array comprising at least one resonator channel configured to suppress at least one selected frequency of interest in the first portion of the rear directed sound waves received by the resonator array, the bypass path structure further configured to dampen an overall energy level of the remaining second portion, the first portion constituting less than all of the rear directed sound waves.

18. The method of claim 17, wherein the bypass path structure comprises an impedance boundary affixed to the rear side of the transducer adjacent the resonant array, the impedance boundary comprising a layer of damping material that spans at least a portion of an overall areal extent of a vibrating membrane of the transducer, and wherein the impedance boundary has a Rayl value of from 0-100.

19. The method of claim 17, wherein the resonator array is a metamaterial structure comprising a plurality of resonator channels characterized as closed quarter-wavelength or Helmholz resonators of different lengths to compensate different selected frequencies of interest within the first portion of the rear directed sound waves.

20. The method of claim 19, wherein the resonator array is directly coupled to the transducer, and wherein the bypass path structure comprises a waveguide that extends from the transducer to the resonator array and an impedance boundary comprising a layer of damping material that spans the transducer and surrounds the waveguide.

* * * * *